US011814305B2

(12) United States Patent
Griffis et al.

(10) Patent No.: US 11,814,305 B2
(45) Date of Patent: Nov. 14, 2023

(54) ELECTROCHLORINATION SYSTEM CONFIGURATIONS FOR THE GENERATION OF HIGH PRODUCT STRENGTH SOLUTIONS

(71) Applicants: Evoqua Water Technologies LLC, Pittsburgh, PA (US); Evoqua Water Technologies Limited, South Wales (GB)

(72) Inventors: Joshua Griffis, Ashburnham, MA (US); Simon Dukes, Chelmsford, MA (US); Paul Beddoes, Bristol (GB); Peter G. Rogers, Belper (GB)

(73) Assignee: Evoqua Water Technologies LLC, Pittsburgh, PA (US)

( * ) Notice: Subject to any disclaimer, the term of this patent is extended or adjusted under 35 U.S.C. 154(b) by 26 days.

(21) Appl. No.: 16/975,125

(22) PCT Filed: Feb. 22, 2019

(86) PCT No.: PCT/US2019/019072
§ 371 (c)(1),
(2) Date: Aug. 22, 2020

(87) PCT Pub. No.: WO2019/165161
PCT Pub. Date: Aug. 29, 2019

(65) Prior Publication Data
US 2021/0087081 A1 Mar. 25, 2021

Related U.S. Application Data

(60) Provisional application No. 62/633,790, filed on Feb. 22, 2018, provisional application No. 62/696,399, filed on Jul. 11, 2018.

(51) Int. Cl.
C25B 15/02 (2021.01)
C25B 1/04 (2021.01)
C02F 1/461 (2023.01)
C02F 1/467 (2023.01)

(52) U.S. Cl.
CPC ........ *C02F 1/46104* (2013.01); *C02F 1/4674* (2013.01); *C02F 2001/46171* (2013.01);
(Continued)

(58) Field of Classification Search
CPC .. C25B 15/02; C25B 1/04; C25B 9/00; C25B 9/17; C25B 1/00; C25B 15/00;
(Continued)

(56) References Cited

U.S. PATENT DOCUMENTS

2007/0051640 A1* 3/2007 Bellamy ............. B01D 61/425
205/742
2011/0024361 A1* 2/2011 Schwartzel ............ C02F 1/325
204/290.01
2015/0165381 A1 6/2015 Mok et al.
2015/0233003 A1 8/2015 Righetti
(Continued)

FOREIGN PATENT DOCUMENTS

CN 105555718 A 5/2016
JP 2016-506288 A 3/2016
(Continued)

OTHER PUBLICATIONS

Unknown, "Second Office Action", Chinese patent application No. 201980027143.2 dated Feb. 10, 2023, 5 pages.
(Continued)

*Primary Examiner* — Zulmariam Mendez

(57) ABSTRACT

An electrochlorination system comprises a source of feed fluid, a product fluid outlet, and a plurality of electrochemical cells connected fluidically between the source of feed fluid and the product fluid outlet. The system is configured to operate at least one of the plurality of electrochemical cells at one of a first current density or a first flow rate, and to operate another of the plurality of electrochemical cells at a second current density or second flow rate different from the respective first current density or first flow rate.

21 Claims, 20 Drawing Sheets

(52) U.S. Cl.
CPC .. *C02F 2201/003* (2013.01); *C02F 2201/007* (2013.01); *C02F 2201/4614* (2013.01); *C02F 2201/46145* (2013.01); *C02F 2209/006* (2013.01); *C02F 2209/008* (2013.01); *C02F 2209/40* (2013.01); *C02F 2301/08* (2013.01); *C02F 2303/04* (2013.01)

(58) Field of Classification Search
CPC ..... C25B 1/26; C25B 9/70; C25B 9/65; C02F 1/46104; C02F 1/4674; C02F 2201/4611; C02F 2201/46145; C02F 2209/40; C02F 2201/4614; C02F 2209/29; C02F 2201/46135

See application file for complete search history.

(56) References Cited

U.S. PATENT DOCUMENTS

2015/0298998 A1* 10/2015 Legzdins .............. C02F 1/4672
204/258
2016/0368791 A1    12/2016 Fu et al.

FOREIGN PATENT DOCUMENTS

| JP | 2016-528031 A | 9/2016 |
| WO | 2017049052 A1 | 3/2017 |

OTHER PUBLICATIONS

"Notice to Submit Response" issued by the Korean Intellectual Property Office for South Korean Patent Application No. 10-2020-7026789, dated Jul. 28, 2023, 17 pages.

* cited by examiner

| STATE | INLET | CV1 | CV2 | CV3 | CV4 | CV5 | PUMP A | PUMP B | ELECTROLYZER | OUTLET | DRAIN |
|---|---|---|---|---|---|---|---|---|---|---|---|
| MAKE-UP | 12m³/h | Open | Open | Closed | Closed | Closed | 12m³/h | 0m³/h | On | 0m³/h | 0m³/h |
| RECYCLE | 0m³/h | Closed | Open | Open | Closed | Closed | 24m³/h | 0m³/h | On | 0m³/h | 0m³/h |
| SHOCK DOSE | 0m³/h | Closed | Closed | Open | Open | Closed | 44m³/h | 44m³/h | Off | 88m³/h | 0m³/h |
| RINSE | 12m³/h | Open | Open | Closed | Closed | Open | 12m³/h | 0m³/h | Off | 0m³/h | 12m³/h |

*FIG. 15B*

ELECTROCHLORINATION SYSTEM CONFIGURATIONS FOR THE GENERATION OF HIGH PRODUCT STRENGTH SOLUTIONS

CROSS-REFERENCE TO RELATED APPLICATION

This application claims priority under 35 U.S.C. § 119(e) to U.S. Provisional Application Ser. No. 62/633,790, titled "CTE SYSTEM CONFIGURATIONS FOR THE GENERATION OF HIGHER PRODUCT STRENGTH SOLUTIONS," filed on Feb. 22, 2018, which is incorporated herein by reference in its entirety for all purposes.

BACKGROUND

1. Field of Invention

Aspects and embodiments disclosed herein are generally directed to electrochemical devices, and more specifically, to electrochlorination cells and devices and systems and methods of utilizing same.

2. Discussion of Related Art

Electrochemical devices used to produce a product solution from a feed stream by chemical reactions at electrodes are widely used in industrial and municipal implementations. Examples of reactions include:

A. Electrochlorination with Generation of Sodium Hypochlorite from Sodium Chloride and Water.

Reaction at anode: $2Cl^- \rightarrow Cl_2 + 2e^-$

Reaction at cathode: $2Na^+ + 2H_2O + 2e^- \rightarrow 2NaOH + H_2$

In solution: $Cl_2 + 2OH^- \rightarrow ClO^- + Cl^- + H_2O$

Overall reaction: $NaCl + H_2O \rightarrow NaOCl + H_2$ $E^0_{ox} = -1.36V$ (Chlorine generation)

$E^0_{red} = -0.83V$ (Hydrogen generation)

$E^0_{cell} = -2.19V$

B. Generation of Sodium Hydroxide and Chlorine from Sodium Chloride and Water, with a Cation Exchange Membrane Separating the Anode and the Cathode:

Reaction at anode: $2Cl^- \rightarrow Cl_2 + 2e^-$

Reaction at cathode: $2H_2O + 2e^- \rightarrow 2OH^- + H_2$

Overall reaction: $2NaCl + 2H_2O \rightarrow 2NaOH + Cl_2 + H_2$

C. Vanadium Redox Battery for Energy Storage, with a Proton Permeable Membrane Separating the Electrodes: During Charging:

Reaction at 1st electrode: $V^{3+} + e^- \rightarrow V^{2+}$

Reaction at 2nd electrode: $V^{4+} \rightarrow V^{5+} + e^-$

During Discharging:

Reaction at 1st electrode: $V^{2+} \rightarrow V^{3+} + e^-$

Reaction at 2nd electrode: $V^{5+} + e^- \rightarrow V^{4+}$

In some implementations, electrochlorination devices may be utilized to generate sodium hypochlorite from sodium chloride present in seawater. The concentration of different dissolved solids in seawater may vary depending on location, however, one example of seawater may include the following components:

TABLE 1

Typical seawater components and concentrations

| Common name | Symbol | mg/l (ppm) |
|---|---|---|
| Chloride | Cl | 19,350 |
| Sodium | Na | 10,750 |
| Sulfate | $SO_4$ | 2,700 |
| Magnesium | Mg | 1,290 |
| Calcium | Ca | 410 |
| Potassium | K | 380 |
| Bicarbonate | $HCO_3$ | 140 |
| Bromide | Br | 65 |
| Strontium | Sr | 13 |
| Aluminum | Al | 1.9 |
| Silicon | Si | 1.1 |
| Fluoride | F | .8 |
| Nitrate | $NO_3$ | .8 |
| Boron | B | .4 |
| Barium | Ba | .2 |
| Iron | Fe | .1 |
| Manganese | Mn | .1 |
| Copper | Cu | .1 |
| Lithium | Li | .1 |
| Phosphorous | P | .06 |
| Iodide | I | .04 |
| Silver | Ag | .02 |
| Arsenic | As | <.01 |
| Nitrite | $NO_2$ | <.01 |
| Zinc | Zn | <.01 |
| Total: | | 35,000 (excluding H & O) |

SUMMARY

In accordance with an aspect of the present invention, there is provided an electrochemical cell. The electrochemical cell comprises a housing having an inlet, an outlet, and a central axis and an anode-cathode pair disposed substantially concentrically within the housing about the central axis and defining an active area between an anode and a cathode of the anode-cathode pair, an active surface area of at least one of the anode and the cathode having a surface area greater than a surface area of an internal surface of the housing, the anode-cathode pair configured and arranged to direct all fluid passing through the electrochemical cell axially through the active area.

In some embodiments, the electrochemical cell has an overall electrode packing density of at least about 2 mm$^{-1}$.

In some embodiments, the electrochemical cell further comprises a central core element disposed within the electrochemical cell and configured to block flow of fluid through a portion of the electrochemical cell along the central axis, the central core element unconnected to at least one electrode of the anode-cathode pair.

In some embodiments, the anode-cathode pair is spiral-wound about the central axis.

In some embodiments, the electrochemical cell further comprises one or more spiral-wound bipolar electrodes. In some embodiments, the anode is laterally displaced from the cathode along a length of the electrochemical cell.

In some embodiments, at least one of the anode and the cathode is a rigid electrode. The anode and the cathode may each include a titanium plate, and surfaces of the anode may be coated with an oxidation resistant coating selected from the group consisting of platinum and a mixed metal oxide.

The anode and the cathode may each comprise one or more of titanium, nickel, and aluminum. Surfaces of the anode may be coated with an oxidation resistant coating selected from the group consisting of platinum, a mixed metal oxide, magnetite, ferrite, cobalt spinel, tantalum, palladium, iridium, gold, and silver. At least one of the anode and the cathode may be fluid permeable and/or may include a perforated titanium plate.

In some embodiments, the electrochemical cell further comprises a separator configured to maintain a gap distance between the anode and the cathode, the separator being open to flow of an electrolyte solution through the active area. The separator may include a hub having spokes with slots that engage edges of at least one of the anode and the cathode. The hub may further include an electrical connector configured to electrically connect the one of the anode and the cathode to a source of current.

In some embodiments, the electrochemical cell further comprises a hub including spokes in electrical contact with one of the anode and the cathode. The spokes may include slots that engage edges of the one of the anode and the cathode and maintain a gap between turns of the spiral wound anode-cathode pair.

In some embodiments, the central core element comprises a non-conductive core disposed within an innermost winding of the anode-cathode pair.

In some embodiments, the anode-cathode pair includes a plurality of concentric electrode tubes and gaps defined between adjacent electrode tubes. The plurality of concentric electrode tubes may include one of a plurality of anode electrode tubes and a plurality of cathode electrode tubes. One of the plurality of anode electrode tubes and the plurality of cathode electrode tubes may be rigid electrodes.

In some embodiments, the plurality of concentric tube electrodes includes a plurality of anode electrode tubes and a plurality of cathode electrode tubes.

In some embodiments, the electrochemical cell is configured to enable current (DC and/or AC) to flow through an electrolyte solution from an anode electrode tube to a cathode electrode tube in a single pass.

In some embodiments, the electrochemical cell further comprises a bipolar electrode tube disposed between an anode electrode tube and a cathode electrode tube.

In some embodiments, an anode electrode tube is laterally displaced along a length of the electrochemical cell from a cathode electrode tube having a same diameter as the anode electrode tube. The electrochemical cell may comprise an electrode tube including an anodic half and a cathodic half.

In some embodiments, the electrochemical cell further comprises a plurality of bipolar electrode tubes disposed between respective concentrically arranged adjacent pairs of anode electrode tubes and cathode electrode tubes.

In some embodiments, at least one of the plurality of anode electrode tubes and the plurality of cathode electrode tubes is perforated and/or fluid permeable. In some embodiments, the electrochemical cell further comprises at least one separator positioned between adjacent electrode tubes, the at least one separator configured to define and maintain a gap between the adjacent electrode tubes. The separator may be open to flow of an electrolyte solution through the gap defined between the adjacent electrode tubes.

In some embodiments, the electrochemical cell further comprises a metallic hub including spokes electrically coupled to edges of a plurality of the concentric electrode tubes. Each spoke may include slots that engage the edges of the plurality of the concentric electrode tubes maintain gaps between adjacent electrode tubes in the plurality of the concentric electrode tubes.

In some embodiments, the central core element includes an end cap disposed within an end of an innermost concentric tube electrode of the electrochemical cell.

In some embodiments, the electrochemical cell has an obround cross section.

In some embodiments, the electrochemical cell further comprises an electrical connector in electrical communication with one of the anode and the cathode, the electrical connector including at least two materials having different degrees of resistance to chemical attack by an electrolyte solution. The at least two materials may include a first material and a second material and the electrical connector may include a fluid permeable body formed of the first material. The fluid permeable body may include a plurality of apertures.

In some embodiments, the electrochemical cell includes a plate or body of the second material coupled to the fluid permeable body formed of the first material with one or more mechanical fasteners.

In some embodiments, the electrochemical cell includes a plate or body of the second material coupled to the fluid permeable body formed of the first material with a compression fit.

In some embodiments, the electrochemical cell includes a plate or body of the second material coupled to the fluid permeable body formed of the first material with threads formed in an edge of the fluid permeable body formed of the first material.

In some embodiments, the electrochemical cell includes a body formed of the second material coupled to the fluid permeable body formed of the first material with threads formed in cylindrical portion of the body formed of the second material.

In some embodiments, the electrochemical cell includes a body formed of the second material welded to the body formed of the first material.

In accordance with another aspect, there is provided a system comprising an electrochemical cell. The electrochemical cell comprises a housing having an inlet, an outlet, and a central axis and an anode-cathode pair disposed substantially concentrically within the housing about the central axis and defining an active area between an anode and a cathode of the anode-cathode pair, an active surface area of at least one of the anode and the cathode having a surface area greater than a surface area of an internal surface of the housing, the anode-cathode pair configured and arranged to direct all fluid passing through the electrochemical cell axially through the active area. The system further comprises a source of electrolyte in fluid communication with the electrochemical cell. The electrochemical cell is configured to produce one or more reaction products from electrolyte from the source of electrolyte and to output the one or more reaction products. The system further comprises a point of use for the one or more reaction products output by the electrochemical cell. The one or more reaction products may include a disinfectant. The disinfectant may include or consist essentially of sodium hypochlorite.

In some embodiments, the source of electrolyte comprises one of brine and seawater.

In some embodiments, the system is included in one of a ship and an oil platform.

In some embodiments, the point of use includes one of a cooling water system and a ballast tank.

In some embodiments, the system is included in a land-based oil drilling system, wherein the point of use is a downhole of the oil drilling system.

In accordance with another aspect, there is provided an electrochemical cell. The electrochemical cell includes a cathode and an anode disposed in a housing and defining a gap therebetween, each of the cathode and anode including arcuate portions, an active surface area of the anode being greater than a surface area of an internal surface of the housing and an active surface area of the cathode being greater than a surface area of an internal surface of the housing, the cathode and anode configured and arranged to direct all fluid passing through the electrochemical cell axially through the gap.

In some embodiments, the anode includes a plurality of plates extending from an arcuate base and the cathode includes a plurality of plates extending from an arcuate base, the plurality of plates of the anode interleaved with the plurality of plates of the cathode.

In accordance with another aspect, there is provided an electrochemical cell. The electrochemical cell includes a cathode and an anode disposed in a housing and defining a gap therebetween, each of the cathode and anode including a portion conforming to respective portions of an internal surface of the housing, an active surface area of the anode being greater than a surface area of an internal surface of the housing and an active surface area of the cathode being greater than a surface area of an internal surface of the housing, the cathode and anode configured and arranged to direct all fluid passing through the electrochemical cell axially through the gap. At least one of the anode and the cathode may include a corrugated portion.

In one embodiment, by varying flow velocity through concentric tube electrode (CTE) cells in a system of CTE cells and current density applied to the electrodes of the CTE cells, it is possible to reduce the factors causing scale formation, and thus construct novel systems with higher product strengths.

In accordance with an aspect, there is provided an electrochlorination system. The system comprises a source of feed fluid, a product fluid outlet, and a plurality of electrochemical cells connected fluidically between the source of feed fluid and the product fluid outlet. The system is configured to operate at least one of the plurality of electrochemical cells at one of a first current density or a first flow rate, and to operate another of the plurality of electrochemical cells at a second current density or second flow rate different from the respective first current density or first flow rate.

In some embodiments, the plurality of electrochemical cells are series electrochemical cells fluidically connected in series.

In some embodiments, the plurality of electrochemical cells are parallel electrochemical cells fluidically connected in parallel.

In some embodiments, the plurality of electrochemical cells includes one or more series electrochemical cells that are fluidically connected in series with one or more parallel electrochemical cells that are fluidically connected in parallel.

In some embodiments, the plurality of electrochemical cells are electrically connected in series.

In some embodiments, the plurality of electrochemical cells are electrically connected in parallel.

In some embodiments, the plurality of electrochemical cells includes one or more electrochemical cells that are electrically connected in series with one or more electrochemical cells that are electrically connected in parallel.

In some embodiments, the plurality of electrochemical cells includes one or more electrochemical cells that are electrically independent of others of the plurality of electrochemical cells.

In some embodiments, the system further comprises a controller configured to operate a first electrochemical cell fluidically upstream of a second electrochemical cell at the first current density and to operate the second electrochemical cell at the second current density, the first current density being higher than the second current density.

In some embodiments, the system further comprises a third electrochemical cell disposed fluidically between the first electrochemical cell and the second electrochemical cell.

In some embodiments, the controller is further configured to operate the third electrochemical cell at a third current density that is lower than the first current density and higher than the second current density.

In some embodiments, the system further comprises a fourth electrochemical cell disposed fluidically downstream of the second electrochemical cell, the controller being further configured to operate the fourth electrochemical cell at the second current density.

In some embodiments, the system further comprises a pump, wherein the controller is further configured to cause the pump to flow fluid from the source of feed fluid through each of the first, second, third, and fourth electrochemical cells at the first flow rate.

In some embodiments, the plurality of electrochemical cells includes a first group of parallel electrochemical cells fluidically connected in parallel between the source of feed fluid and a plurality of series electrochemical cells fluidically connected in series.

In some embodiments, the system further comprises a controller configured to operate each of the electrochemical cells in the group of parallel electrochemical cells at the first flow rate and to operate each of the electrochemical cells in the plurality of series electrochemical cells at the second flow rate, the first flow rate being less than the second flow rate.

In some embodiments, fluid outlet conduits from each of the electrochemical cells in the group of parallel electrochemical cells are combined into a single fluid input conduit of the plurality of series electrochemical cells.

In some embodiments, the controller is further configured to operate each of the electrochemical cells in the group of parallel electrochemical cells and each of the electrochemical cells in the plurality of series electrochemical cells at the first current density.

In some embodiments, the controller is further configured to operate each of the electrochemical cells in the group of parallel electrochemical cells at the first current density and to operate each of the electrochemical cells in the plurality of series electrochemical cells at the second current density.

In some embodiments, the first current density is greater than the second current density.

In some embodiments, the system further comprises a product tank fluidically connected to a fluid outlet of the plurality of electrochemical cells.

In some embodiments, the system further comprises a parallel electrochemical cell having a fluid inlet connected to a fluid outlet of the product tank and a fluid outlet connected to a fluid inlet of the product tank.

In some embodiments, the system further comprises a controller configured to operate the parallel electrochemical cell at a third current density different from the first current density and from the second current density.

In some embodiments, the system further comprises a controller configured to operate the parallel electrochemical cell at a third flow rate different from the first flow rate and from the second flow rate.

In some embodiments, the system further comprises a controller configured to operate the parallel electrochemical cell at one of the first current density or the second current density.

In some embodiments, the system further comprises a controller configured to operate the parallel electrochemical cell at one of the first flow rate or the second flow rate.

In accordance with another aspect, there is provided an electrochlorination system. The system comprises a source of feed fluid, a product fluid outlet, a pair of parallel electrochemical cells fluidly connected in parallel to a fluid outlet of the source of feed fluid, a series electrochemical cell connected fluidically in series between the pair of parallel electrochemical cells and the product fluid outlet, and a controller configured to operate the pair of parallel electrochemical cells at one of a first current density or a first flow rate, and to operate the series electrochemical cell at a second current density or second flow rate different from the first current density or first flow rate.

In some embodiments, the controller is configured to operate each of the electrochemical cells in the pair of parallel electrochemical cells and the series electrochemical cell at a same current density.

In accordance with another aspect, there is provided a method of operating an electrochlorination system. The method comprises flowing a feed fluid through a first electrochemical cell and through a second electrochemical cell of the system, the second electrochemical cell being operated at one of a different current density or a different flow velocity than a respective current density or flow velocity of the first cell.

In some embodiments, the method comprises flowing the feed fluid through the first electrochemical cell and through the second electrochemical cell in series.

In some embodiments, the method comprises flowing the feed fluid through the first electrochemical cell and through the second electrochemical cell in parallel.

In some embodiments, the method further comprises flowing the feed fluid through a third electrochemical cell in series with the first and second electrochemical cells.

In some embodiments, the method further comprises one of flowing the feed fluid from both the first and second electrochemical cells into the third electrochemical cell, or flowing the feed fluid from the third electrochemical cell into both the first and second electrochemical cells.

In some embodiments, the flow velocity of the feed fluid through the third electrochemical cell is a sum of the flow velocities of the feed fluid through the first and second electrochemical cells.

In some embodiments, each of the first, second, and third electrochemical cells are operated at a same current density.

In some embodiments, the method comprises flowing the feed fluid through the first and second electrochemical cells at a same flow velocity.

In some embodiments, the method further comprises operating the first electrochemical cell at a higher current density than the second electrochemical cell.

In some embodiments, the method comprises flowing the feed fluid through the second electrochemical cell at a flow velocity higher than a flow velocity of the feed fluid through the first electrochemical cell.

In some embodiments, the method further comprises recirculating feed fluid from an outlet of the second electrochemical cell to an inlet of the second electrochemical cell.

In some embodiments, the method further comprises operating the first electrochemical cell at a higher current density than the second electrochemical cell.

In some embodiments, the method further comprises recirculating feed fluid from an outlet of the second electrochemical cell to an inlet of the first electrochemical cell.

In some embodiments, the method further comprises operating the first electrochemical cell at a higher current density than the second electrochemical cell.

In some embodiments, the method further comprises flowing the feed fluid from a product tank into the first electrochemical cell, from the first electrochemical cell through the second electrochemical cell, and from the second electrochemical cell back into the product tank.

In some embodiments, the method further comprises operating the first electrochemical cell at a higher current density than the second electrochemical cell.

In some embodiments, the method further comprises flowing the feed fluid from the first electrochemical cell into a product tank.

In some embodiments, the method further comprises recirculating feed fluid from the product tank through the second electrochemical cell and then back into the product tank.

In some embodiments, the method further comprises operating the first electrochemical cell at a higher current density than the second electrochemical cell.

In accordance with another aspect, there is provided a method of operating an electrochlorination system. The method comprises flowing feed fluid through an electrolyzer at a first flow rate to produce a product solution, the electrolyzer including one or more electrochemical cells, flowing the product solution from the electrolyzer operating at the first flow rate into a product tank, recirculating the product solution from the product tank through the electrolyzer and back into the product tank at a second flow rate higher than the first flow rate, and flowing the product solution at a third flow rate higher than the second flow rate from the product tank and through an outlet of the electrochlorination system to a point of use.

Embodiments of methods disclosed herein may include electrochemically generating a product solution having a NaOCl concentration of at least 3000 ppm from the feed fluid.

Embodiments of methods disclosed herein may include electrochemically generating a product solution having a NaOCl concentration of at least 6000 ppm from the feed fluid.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 15B is a table of operating parameters of the system of FIG. 15A;

DETAILED DESCRIPTION

Figure 1A:
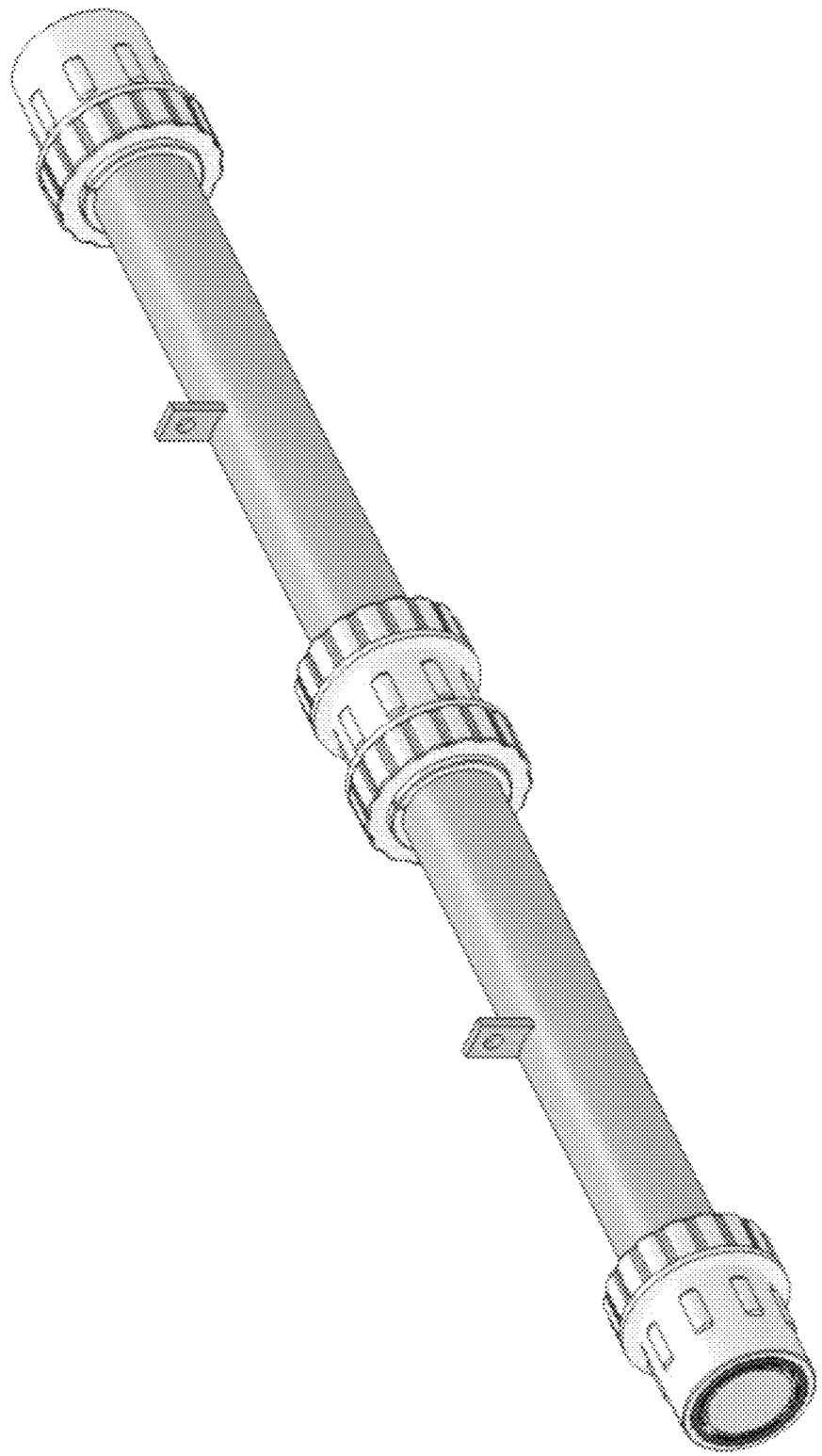
FIG. 1A is a perspective view of an embodiment of a concentric tube electrolyzer cell.

Aspects and embodiments disclosed herein are not limited to the details of construction and the arrangement of components set forth in the following description or illustrated in the drawings. Aspects and embodiments disclosed herein are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

This disclosure describes various embodiments of systems including electrochlorination cells and electrochlorination devices, however, this disclosure is not limited to systems including electrochlorination cells or devices and the aspects and embodiments disclosed herein are applicable to systems including electrolytic and electrochemical cells used for any one of multiple purposes.

Current commercially available electrochlorination cells are typically based on one of two electrode arrangements, concentric tubes (CTE) and parallel plates (PPE).

Aspects and embodiments disclosed herein are generally directed to systems including electrochemical devices to generate disinfectants such as sodium hypochlorite. The terms "electrochemical device" and "electrochemical cell" and grammatical variations thereof are to be understood to encompass "electrochlorination devices" and "electrochlorination cells" and grammatical variations thereof. Aspects and embodiments of electrochemical cells disclosed herein are described as including one or more electrodes.

Embodiments of electrochemical cells included in systems disclosed herein may include metal electrodes, for example, one or more anodes, one or more cathodes, and/or one or more bipolar electrodes. The term "metal electrodes" or grammatical variation thereof as used herein is to be understood to encompass electrodes formed from, comprising, or consisting of one or more metals, for example, titanium, aluminum, or nickel although the term "metal electrode" does not exclude electrodes including of consisting of other metals or alloys. In some embodiments, a "metal electrode" may include multiple layers of different metals. Metal electrodes utilized in any one or more of the embodiments disclosed herein may include a core of a high-conductivity metal, for example, copper or aluminum, coated with a metal or metal oxide having a high resistance to chemical attack by electrolyte solutions, for example, a layer of titanium, platinum, a mixed metal oxide (MMO), magnetite, ferrite, cobalt spinel, tantalum, palladium, iridium, silver, gold, or other coating materials. "Metal electrodes" may be coated with an oxidation resistant coating, for example, but not limited to, platinum, a mixed metal oxide (MMO), magnetite, ferrite, cobalt spinel, tantalum, palladium, iridium, silver, gold, or other coating materials. Mixed metal oxides utilized in embodiments disclosed herein may include an oxide or oxides of one or more of ruthenium, rhodium, tantalum (optionally alloyed with antimony and/or manganese), titanium, iridium, zinc, tin, antimony, a titanium-nickel alloy, a titanium-copper alloy, a titanium-iron alloy, a titanium-cobalt alloy, or other appropriate metals or alloys. Anodes utilized in embodiments disclosed herein may be coated with platinum and/or an oxide or oxides of one or more of iridium, ruthenium, tin, rhodium, or tantalum (optionally alloyed with antimony and/or manganese). Cathodes utilized in embodiments disclosed herein may be coated with platinum and/or an oxide or oxides of one or more of iridium, ruthenium, and titanium. Electrodes utilized in embodiments disclosed herein may include a base of one or more of titanium, tantalum, zirconium, niobium, tungsten, and/or silicon. Electrodes for any of the electrochemical cells in any of the systems disclosed herein can be formed as or from plates, sheets, foils, extrusions, and/or sinters.

Some aspects and embodiments of electrochemical cells included in systems disclosed herein are described as including rigid electrodes. As the term is used herein, a "rigid" object is one that maintains its shape in the absence of an applied force at a normal operating temperature and/or at an elevated temperature. A "rigid electrode," as the term is used herein, is considered to have sufficient mechanical stiffness such that it maintains its shape and separation between adjacent electrodes or electrode windings in the various embodiments of electrochemical cells and devices disclosed herein without the need for spacers. For example, a flexible film including a metal coating is not to be considered a "rigid electrode" as the term is used herein.

The term "tube" as used herein includes cylindrical conduits, however, does not exclude conduits having other cross-sectional geometries, for example, conduits having square, rectangular, oval, or obround geometries or cross-sectional geometries shaped as any regular or irregular polygon.

The terms "concentric tubes" or "concentric spirals" as used herein includes tubes or interleaved spirals sharing a common central axis but does not exclude tubes or interleaved spirals surrounding a common axis that is not necessarily central to each of the concentric tubes or interleaved spirals in a set of concentric tubes or interleaved spirals.

In some embodiments, a line passing from a central axis of an electrochlorination cell toward a periphery of the electrochlorination cell in a plane defined normal to the central axis passes through multiple electrode plates. The multiple electrode plates may include multiple anodes and/or multiple cathodes and/or multiple bipolar electrodes. The central axis may be parallel to an average direction of flow of fluid through the electrochemical cell.

In embodiments of electrochemical cells included in systems disclosed herein including multiple anode or cathode tube electrodes, the multiple anode tube electrodes may be referred to collectively as the anode or the anode tube, and the multiple cathode tube electrodes may be referred to collectively as the cathode or the cathode tube. In embodiments of electrochemical cells included in systems including multiple anode and/or multiple cathode tube electrodes, the multiple anode tube electrodes and/or multiple cathode tube electrodes may be collectively referred to herein as an anode-cathode pair.

In some aspects and embodiments of electrochemical cells included in systems disclosed herein including concentric tube electrodes, for example, one or more anodes and/or cathodes as disclosed herein, the electrodes are configured and arranged to direct fluid through one or more gaps between the electrodes in a direction parallel to a central axis of the electrochemical cell. In some aspects and embodiments of electrochemical cells including concentric tube electrodes, for example, one or more anodes and/or cathodes as disclosed herein, the electrodes are configured and arranged to direct all fluid introduced into the electrochemical cell through the one or more gaps between the electrodes in a direction parallel to a central axis of the electrochemical cell.

Electrochlorination cells are used in marine, offshore, municipal, industrial and commercial applications. The design parameters of electrochlorination cells including a plurality of concentric electrode tubes, for example, inter-electrode spacing, thickness of electrodes and coating density, electrode areas, methods of electrical connections, etc., can be selected for different implementations. Aspects and embodiments disclosed herein are not limited to the number of electrodes, the space between electrodes, the electrode material or spacer material, number of passes within the electrochlorination cells or electrode coating material.

PCT application PCT/US2016/018210 is incorporated herein by reference in entirety for all purposes.

One major consideration for CTE cells is that of cathodic scaling, which limits the overall strength of hypochlorite that can be generated. As local pH at the cathode approaches 10.7-11, magnesium in solution will precipitate to form magnesium hydroxide and occlude the electrode surface. Without being bound to a particular theory, it is believed that the following reactions may occur at the cathode of a CTE cell to generate scale:

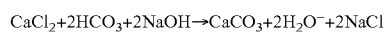

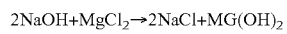

The potential for scale can also increase due to the presence of excessive hydrogen (reduced volume) and high temperature (faster kinetics). If scale deposits are continuously allowed to form, they can occlude the CTE electrode gap, causing the system to fail.

Two measures for the prevention of scale are:
Turbulence: Velocities above 2 m/s are considered to clean scale
Current Density: 3000 A/m$^2$ is nominal, but can be reduced to about 1500 A/m$^2$ Aspects and embodiments disclosed herein provide for the operation of systems including multiple CTE cells to produce product with a higher concentration of NaOCl than previously achievable without build up of scale in the CTE cells of the systems. Aspects and embodiments may achieve these advantages by selection of appropriate configurations of CTE cells with appropriate flow velocities and current densities. Other parameters that may be selected or adjusted to achieve high product concentration without cell scaling include feedwater composition (e.g., TDS, pH, etc.) and/or kinetics (e.g., temperature, flow rate, etc.).

Figure 1B:
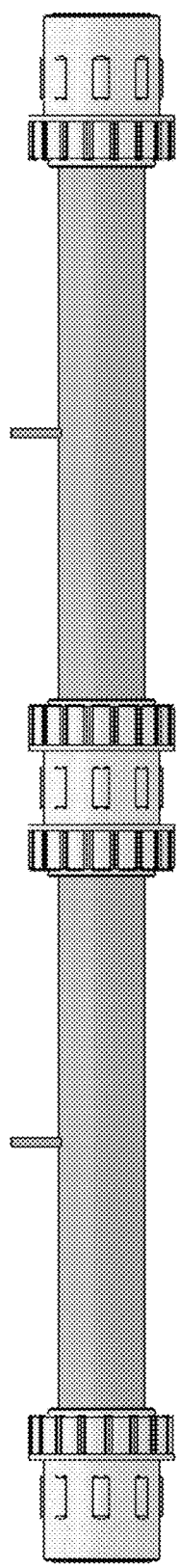
FIG. 1B is a side view of the concentric tube electrolyzer cell of FIG. 1A.
Figure 1C:
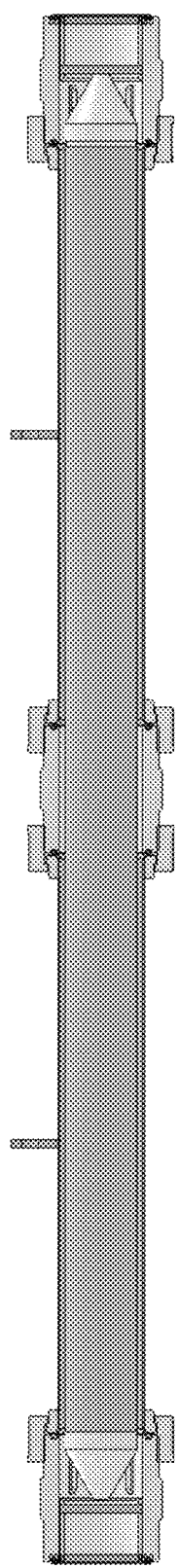
FIG. 1C is a cross-sectional view of the concentric tube electrolyzer cell of FIG. 1A.
Figure 2A:
FIG. 2A is a perspective view of an embodiment of a multi-tube concentric tube electrolyzer cell.
Figure 2B:
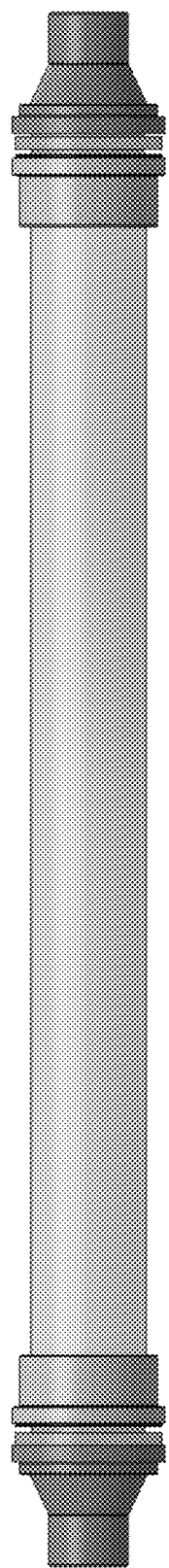
FIG. 2B is a side view of the concentric tube electrolyzer cell of FIG. 2A.
Figure 2C:
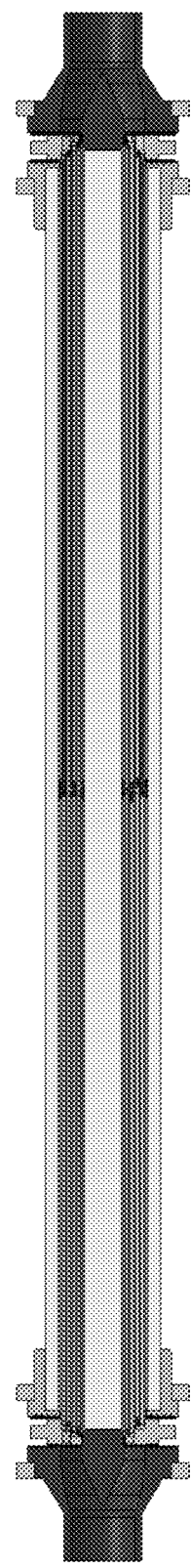
FIG. 2C is a cross-sectional view of the concentric tube electrolyzer cell of FIG. 2A.

Another aspect of cell design is that of volumetric footprint, since larger footprints have higher relative operating expense (OPEX) costs. Previous state of the art CTE cells, for example, as illustrated in FIGS. 1A-1C contained an anode surface area of about 0.138 m$^2$ within an approximate volume of 0.02 m$^3$. Current state of the art CTE cells including multiple alternating concentric anodes and cathodes, for example, as illustrated in FIGS. 2A-2C, however, contain an anode surface area of about 0.85 m$^2$ within the same volume. This represents a roughly 6× increase for the same volumetric footprint.

In some examples, previous state of the art CTE cells operating in regions with high temperatures (40° C.-45° C.) and with seawater having higher than average levels of dissolved solids (TDS) were limited with respect to the concentration of sodium hypochlorite product that could be produced and a flow rate that should be maintained to avoid scaling. In one example of an installation of previous state of the art CTE cells located in the Middle East, the cells could produce a product solution with 1000 ppm NaOCl, but were operated at a flowrate of 8 m$^3$/hr with a current density of 3000 A/m$^2$ and still accumulated scale that was removed in cleaning operations performed every two to three months. Under similar conditions, current state of the art CTE cells could produce a product solution with 1000 ppm NaOCl and be operated at a flow rate of 7.5 m$^3$/h and not require cleaning due to scale build up after 8 months of operation. In another example, current state of the art CTE cells as described in PCT Application No. PCT/US2018/027564, incorporated by reference herein, are capable of operating with the same high temperature/high TDS seawater to produce a product solution with 2500-3000 ppm NaOCl while operated at a flow velocity of 2-3 m/s and 3000 A/m$^2$ and be self-cleaning and not generate scale.

Figure 3:
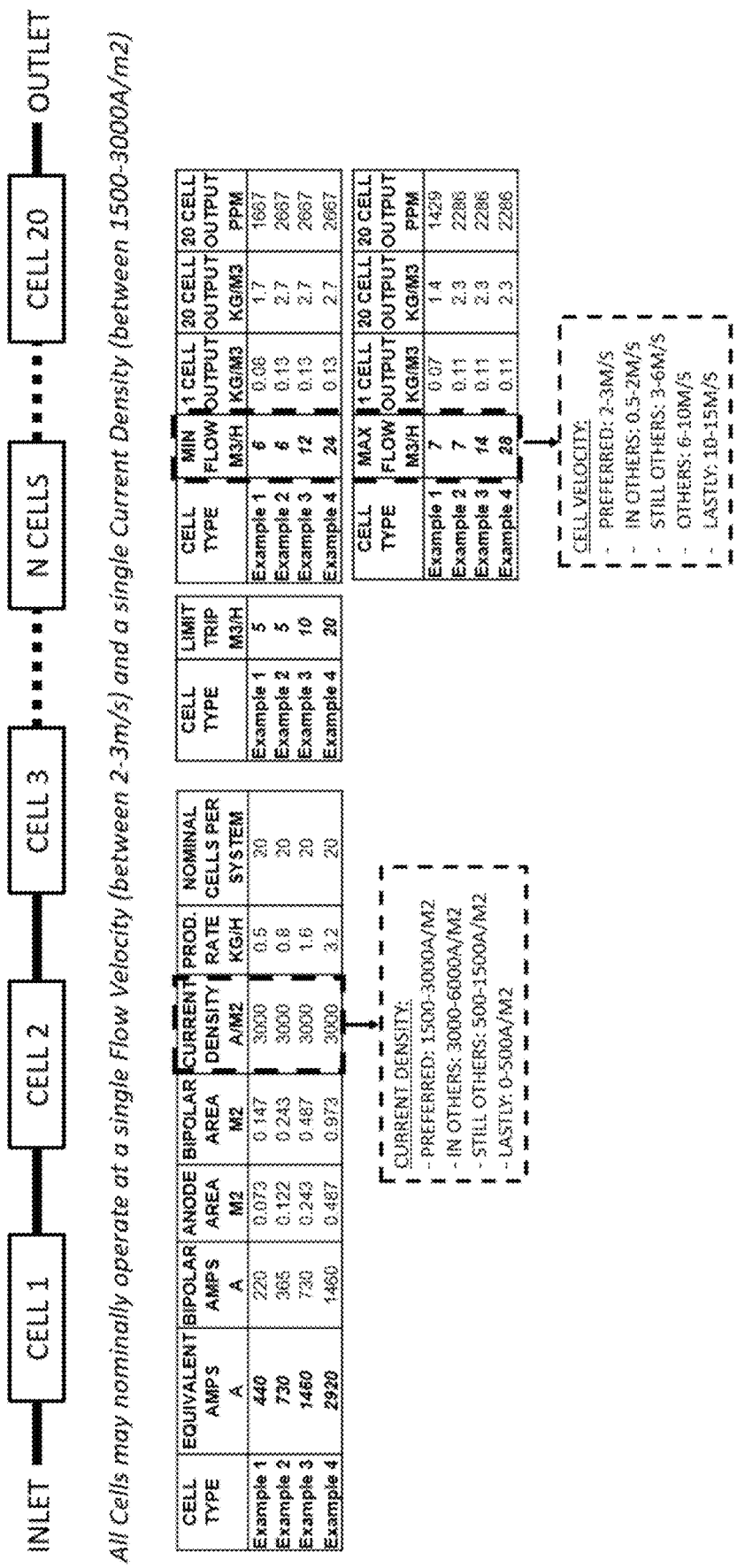
FIG. 3 includes tables listing different design parameters of a 20-cell electrolyzer system.

Different electrochemical cell configurations disclosed herein may operate in accordance with different design parameters. FIG. 3 includes tables listing design parameters from four different examples of systems each including 20 electrochemical cells operating in series. Example 1 is a system including two-tube electrochemical cells with diameters of about 50 mm and lengths of about 1 m. Example 2 is a system including three-tube electrochemical cells with diameters of about 50 mm and lengths of about 1.2 m. Example 3 is a system including three-tube electrochemical cells with diameters of about 100 mm and lengths of about 1.2 m. Example 4 is a system including five-tube electrochemical cells with diameters of about 100 mm and lengths of about 1.2 m. The NaOCl production (PROD. RATE, CELL OUTPUT parameters in FIG. 3) of each example system was calculated assuming a 3000 A/m² current density across the electrodes of each electrochemical cell. Each example has a recommended maximum flow rate, which may be set based on the associated pressure drop across the electrochemical cells and their mechanical strength, and a recommended minimum flow rate, which may be set at a rate that avoids scale build-up in the electrochemical cells. The systems may be operated with a failsafe that cuts flow of current to the electrochemical cells if the flow rate through the cells drops below a minimum (LIMIT TRIP parameters in FIG. 3).

As illustrated in FIG. 3, embodiments of an electrolyzer system may include, for example, 20 electrochemical cells arranged in series with all cells operating with the same flow velocity and current density. The current density of 3000 A/m² is one example. Other systems may operate with current densities of 1500-3000 A/m², 3000-6000 A/m², 500-1500 A/m², or 0-500 A/m². In some examples, the flow velocity of liquid through the electrochemical cells may be 2-3 m/s, but in other examples may be 0.5-2 m/2, 3-6 m/s, or 10-15 m/s. The identification of the different embodiments in FIG. 3 is not intended to indicate that these embodiments are each distinct. For example, electrolyzer systems including electrochemical cell operating with the current density of one or more of Embodiments 1-4 may operate with the cell velocities of any of Embodiments 5-9.

Figure 4:
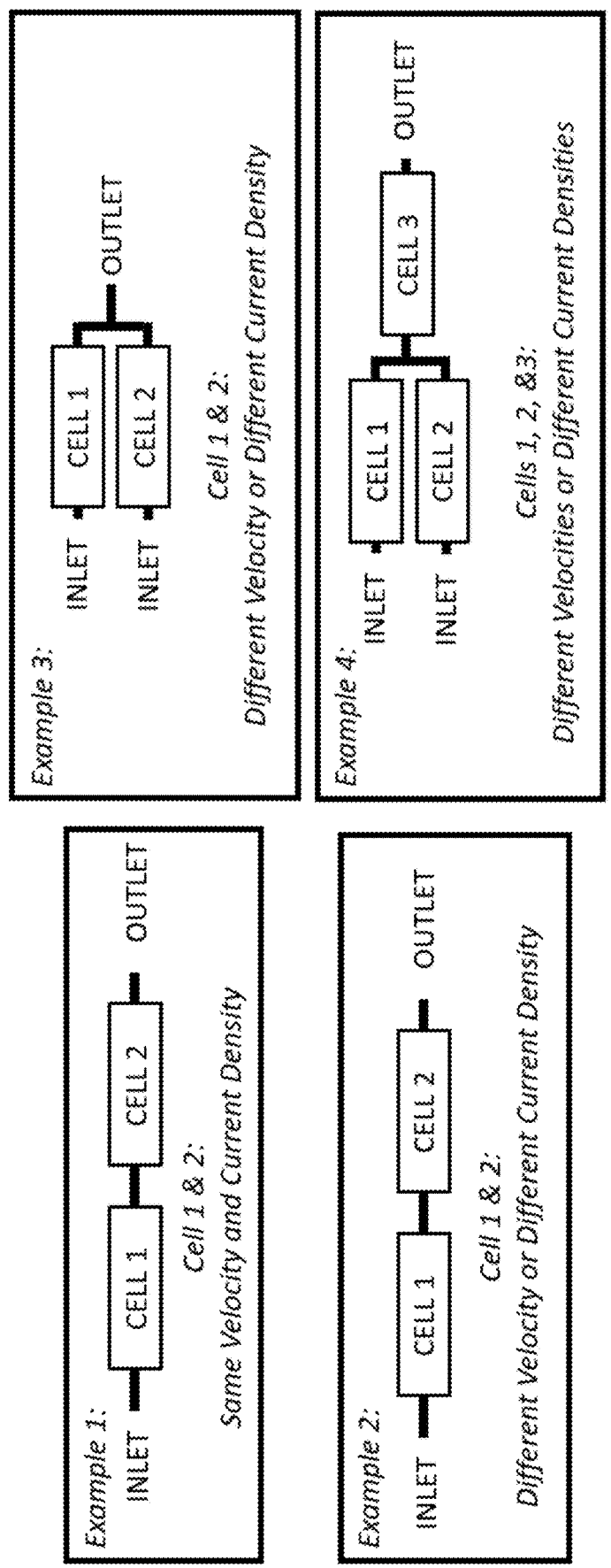
FIG. 4 illustrates examples of different arrangements of fluidic connections between cells in an electrolyzer system.

Embodiments of an electrolyzer system may include multiple electrochemical cells that may be fluidically and/or electrically connected in series and/or in parallel. FIG. 4 illustrates four different examples of arrangements of fluidic connections between electrochemical cells in an electrolyzer system. For all examples in FIG. 4, cells 1, 2, and 3 can have the same or different flow velocities, dependent upon on their respective flow areas, and the same or different current densities, dependent upon their respective electrode areas. It is to be appreciated that the examples illustrated in FIG. 4 show only connections between adjacent cells. The examples illustrated in FIG. 4 may be expanded to encompass electrolyzer systems with a greater number, for example, 20 or more electrochemical cells with adjacent electrochemical cells fluidically connected in accordance with one or more of the examples illustrated in FIG. 4.

Figure 5:
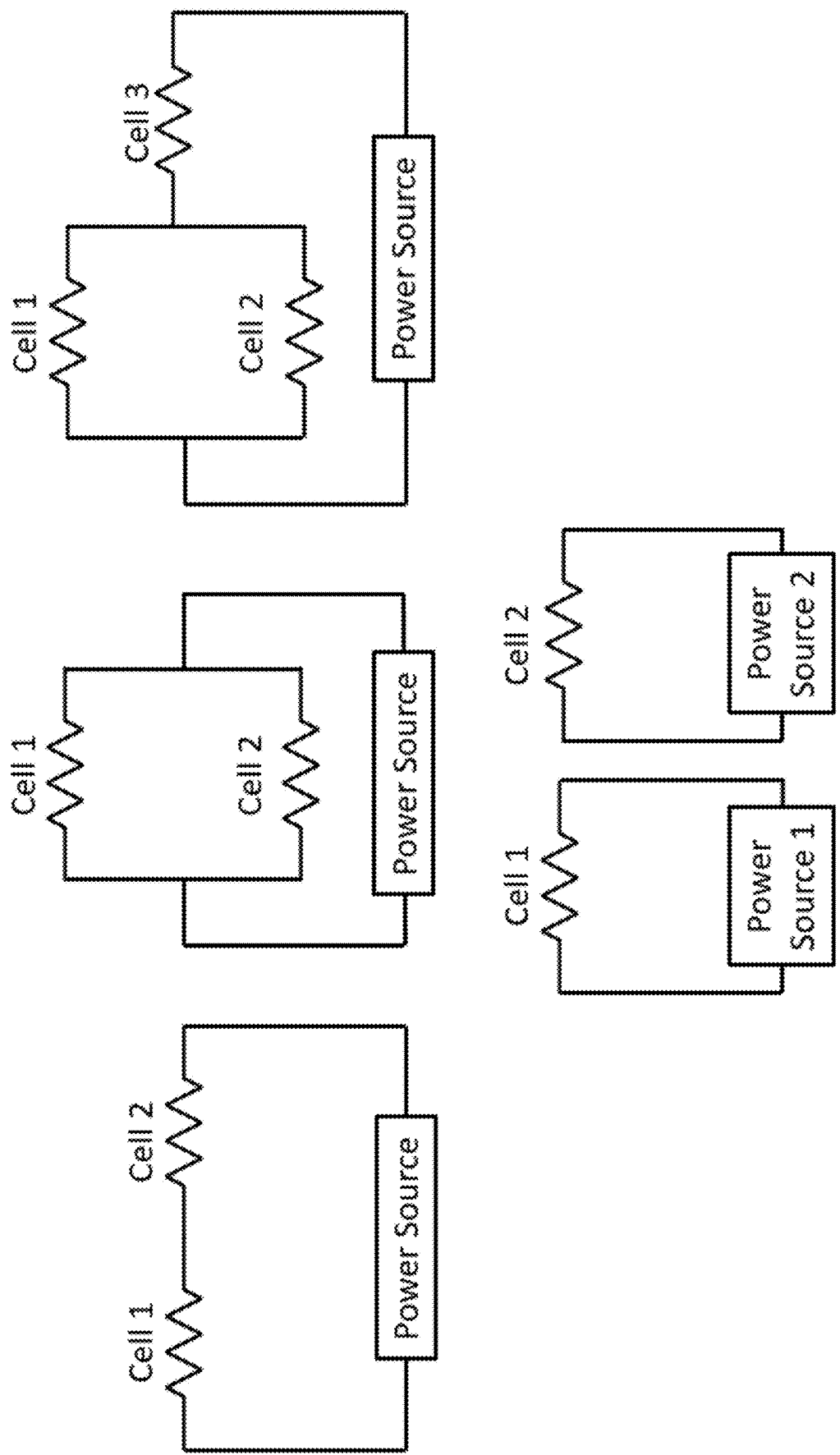
FIG. 5 illustrates examples of different arrangements of electrical connections between cells in an electrolyzer system.

Different arrangements of power connections to adjacent electrochemical cells of an electrolyzer system are illustrated in the examples shown in FIG. 5. As shown, adjacent electrochemical cells may be connected electrically in series, in parallel, in a combination of series and parallel, or may be each powered by a separate dedicated power source. For all examples in FIG. 5, cells 1, 2, and 3 can have the same or different Current Densities, dependent upon their respective electrode areas. The examples illustrated in FIG. 5 may be expanded to encompass electrolyzer systems with a greater number, for example, 20 or more electrochemical cells with adjacent electrochemical cells electrically connected in accordance with one or more of the examples illustrated in FIG. 5.

Figure 6:
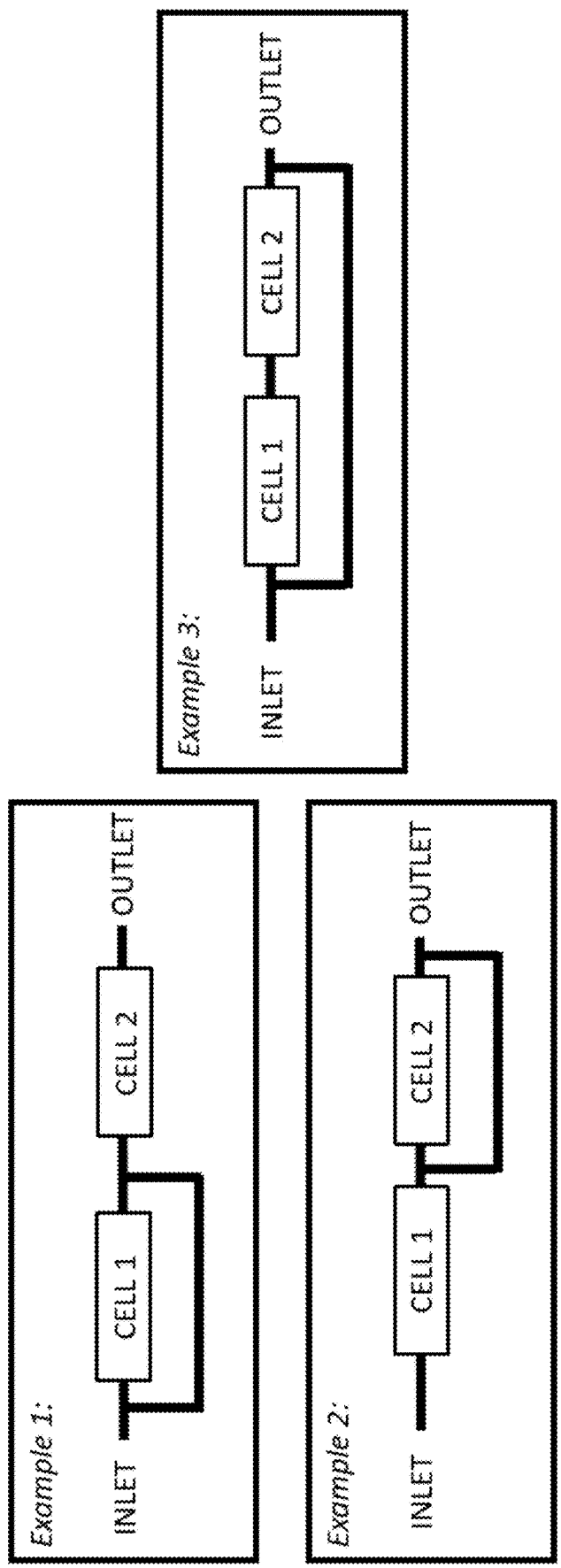
FIG. 6 illustrates examples of different arrangements recirculation lines between cells in an electrolyzer system.

In some embodiments of electrolyzer systems disclosed herein, fluid may be recirculated between the output of a downstream electrochemical cell to the inlet of an upstream electrochemical cell. FIG. 6 illustrates three examples of recirculation of fluid through electrochemical cells in an electrolyzer system. In example 1, an upstream cell may include a recirculation line that recirculates at least some fluid from an outlet to the inlet of the upstream cell while a downstream cell is not coupled to a recirculation line. In example 2, a downstream cell may include a recirculation line that recirculates at least some fluid from an outlet to the inlet of the downstream cell while an upstream cell is not coupled to a recirculation line. In example 3, a downstream cell may include a recirculation line that recirculates at least some fluid from an outlet of the downstream cell to the inlet of an upstream cell. For each examples illustrated in FIG. 6, recirculation can occur for one or more cells, having the same or different flow velocities, dependent upon on their respective flow areas, and the same or different current densities, dependent upon their respective electrode areas. It is to be appreciated that recirculation may be performed through multiple electrochemical cells, and not just the limited number illustrated in FIG. 6. For example, either of cell 1 or cell 2 in FIG. 6 may be replaced with multiple electrochemical cells fluidically connected in series and/or parallel.

Figure 7:
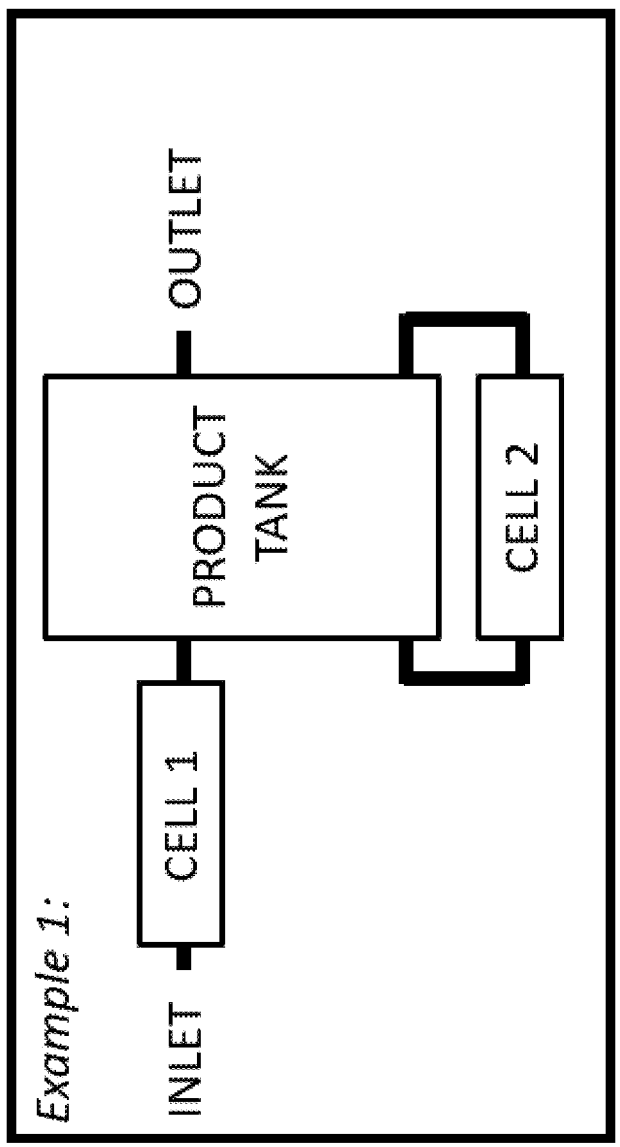
FIG. 7 illustrates recirculation of fluid from a product tank through an electrochemical cell in an electrolyzer system.

Embodiments of electrolyzer systems disclosed herein may include a product tank that receivers treated fluid from one or more electrochemical cells. As illustrated in the example of FIG. 7, the product tank may be fed by one or more cells, with one or more cells recirculating off the product tank. The one or more cells may have the same or different flow velocities, dependent upon on their respective flow areas, and may have the same or different current densities, dependent upon their respective electrode areas. It is to be appreciated that recirculation may be performed through multiple electrochemical cells, and not just the one cell illustrated in FIG. 7. For example, either of cell 1 or cell 2 in FIG. 7 may be replaced with multiple electrochemical cells fluidically connected in series and/or parallel.

Figure 8:
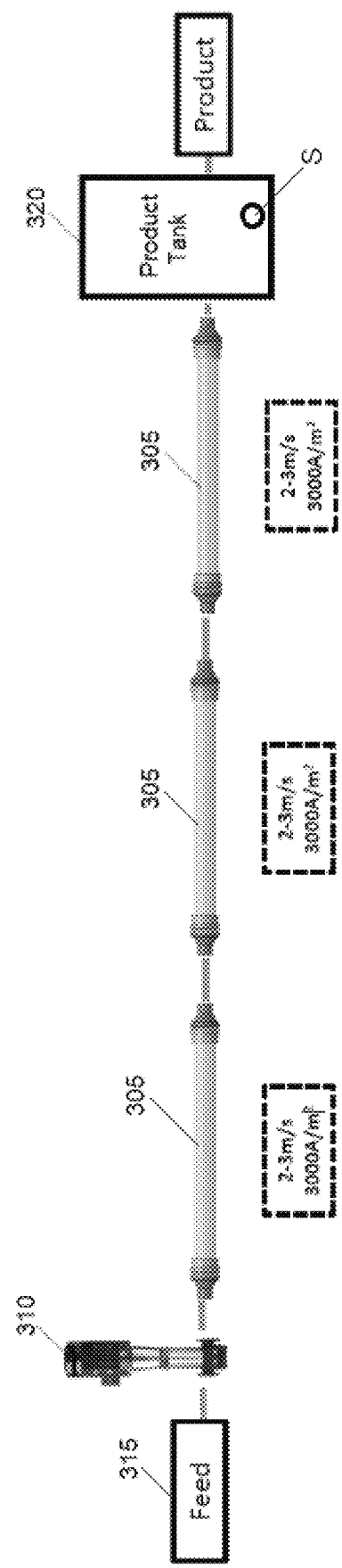
FIG. 8 depicts an example of a once-through electrolyzer system.
Figure 16:
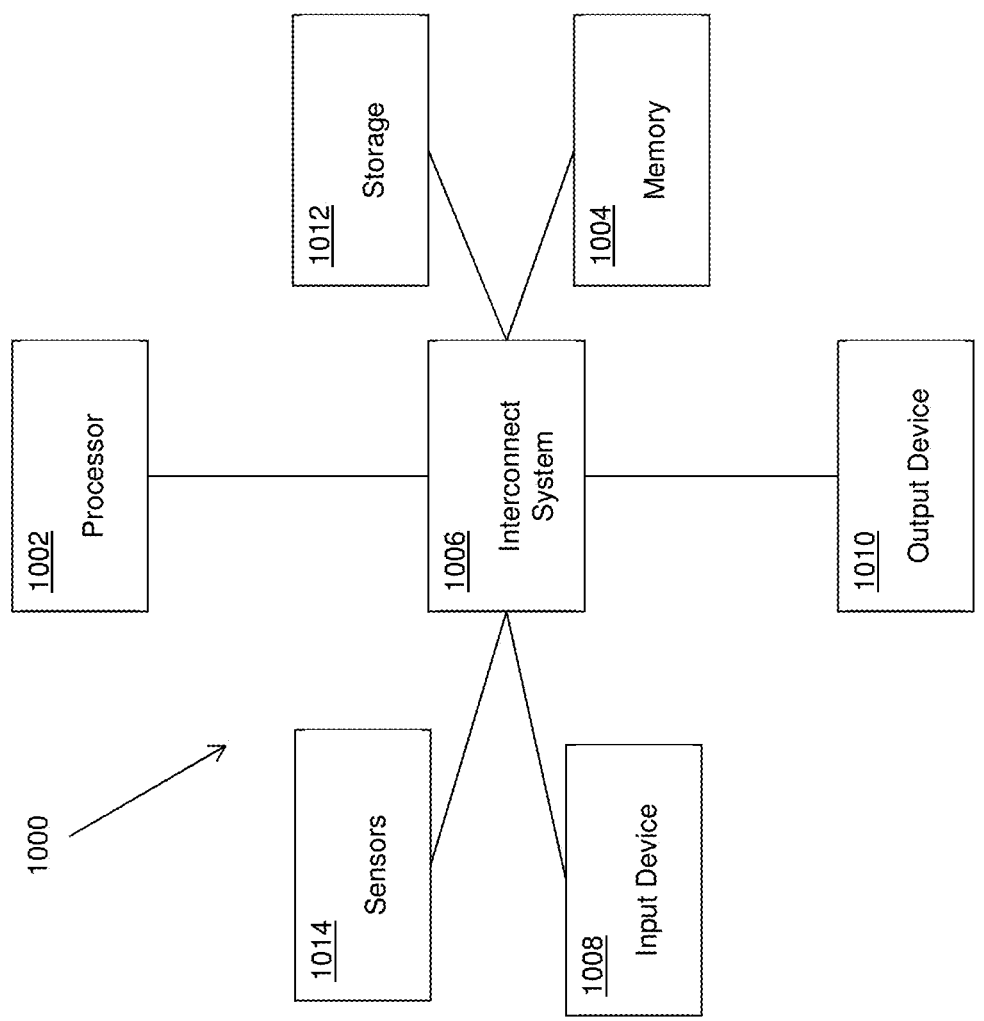
FIG. 16 illustrates a control system for embodiments of electrochemical cells and systems disclosed herein.

FIG. 8 depicts a once-through electrolyzer system, comprised of three current state-of-art CTE cells 305 in series. A pump 310 is configured and arranged to pump feed liquid, for example, seawater, brine, or brackish water, from a source of feed liquid 315 through the cells 305. The pump 310, or any of the pumps in the different embodiments disclosed herein may include one or more sensors, for example, a flow meter or other sensor for one or more quality indicators, for example, sensors for measuring pH, temperature, oxidation-reduction potential (ORP), conductivity, or dissolved oxygen in fluid passing through the pump. The pump 310 and any included sensors may be in communication with a control system, for example, as illustrated in FIG. 16 for monitoring and controlling operation of the system. In other embodiments, an electrolyzer system does not utilize a controller, but rather, the flow velocity through the cells of the system and the current densities of the cells are set and operated at constant values.

The chlorinated liquid generated in the cells may be stored in a product tank 320 until used as product. The chlorinated liquid generated in the cells may have a concentration of NaOCl of, for example, about 3000 ppm. In such a configuration, the nominal flow velocity would likely be 2-3 m/s, for example, 2 m/s, or 2 m/s or greater, the nominal current density would likely be 3000 A/m², and the nominal electrode area would be equivalent to approximately 18 previous state of art cells. The product tank 320, or any of the product tanks in any of the different embodiments disclosed herein may include one or more sensors S, for example, a flow meter or other sensor for one or more quality indicators, for example, sensors for measuring pH, temperature, oxidation-reduction potential (ORP), conductivity, or dissolved oxygen in fluid entering or present in the product tank 320. Any sensors included in the product tank 320 may be in communication with a control system, for example, as illustrated in FIG. 16 for monitoring and controlling operation of the system. It is to be appreciated that additional tanks, valves, or pumps may be included in the system illustrated in FIG. 8 or any of the other systems disclosed herein in appropriate positions as would be appreciated by one of ordinary skill in the art.

Figure 9:
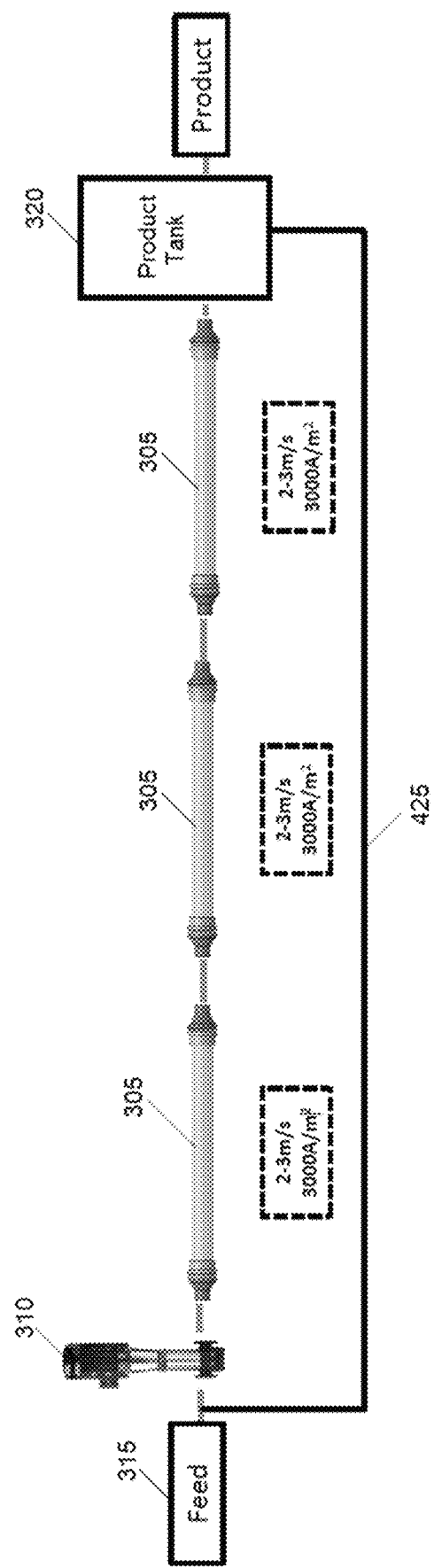
FIG. 9 depicts an example of a feed-and-bleed electrolyzer system.

FIG. 9 depicts a feed-and-bleed electrolyzer system in which chlorinated liquid generated in the cells 305 may be returned upstream to mix with feed liquid entering the pump 310 through a recycle line 425. Recycle line 425 may include one or more pumps and/or valves (not shown). Again, the nominal flow velocity would likely be 2-3 m/s, for example, 2 m/s, or 2 m/s or greater, and the nominal current density would likely be 3000 A/m$^2$. In such a configuration, it is possible to increase the overall strength of hypochlorite in the product fluid produced, for example, up to about 6000 ppm NaOCl or more, however, as detailed above, consideration should be made to cathodic scaling as solution strength and pH increase.

From the above, and controlling for temperature/$H_2$ production, alternative system orientations could be envisioned to compensate for increasing pH, and thus achieve a higher product strength. These systems would still have a smaller overall footprint, relative to the previous state of art.

Figure 10:
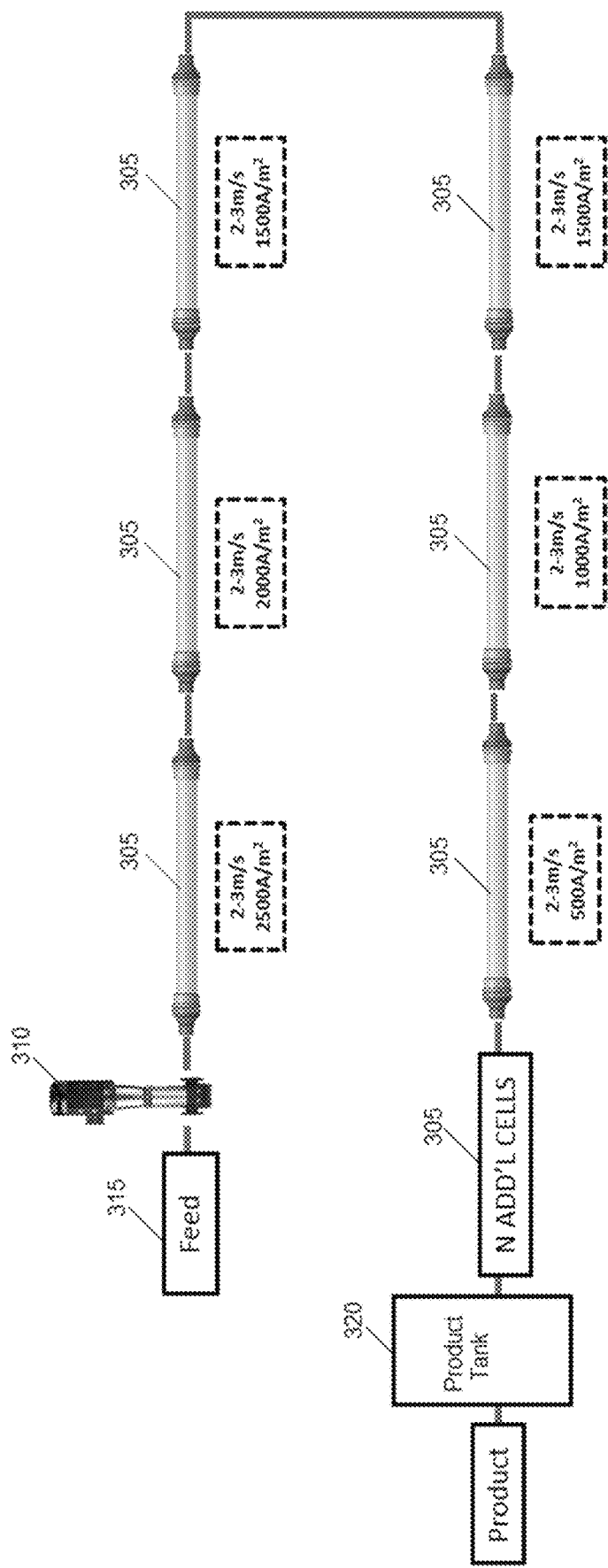
FIG. 10 depicts an example of a once-through electrolyzer system including a plurality of CTE cells in series.

FIG. 10 depicts a once-through electrolyzer system, comprised of a plurality, for example, six or more, or up to 20 or more, current state-of-art CTE cells 305 in series, although it should be appreciated that such systems may also have less than six cells 305, for example, four or five cells 305 in series. Lower current density, for example 1500 A/m$^2$, 1000 A/m$^2$, or 500 A/m$^2$ is applied across the electrodes of cells at the end of the system than at cells at the beginning of the system closer to the feed inlet to compensate for increasing pH. The applied current density may drop from a highest value, for example, 2500 A/m$^2$ at the furthest upstream cell 305, and may drop, for example, to 2000 A/m$^2$ and 1500 A/m$^2$ in the second and third cells 305 in series. The applied current density may continue to drop for cells further downstream or may attain a constant value, for example, 1500 A/m$^2$, 1000 A/m$^2$, or 500 A/m$^2$ for adjacent downstream cells 305. Fluid flow velocity may be the same, for example, 2-3 m/s, 2 m/s, or 2 m/s or greater for each cell 305 in the system.

Figure 11:
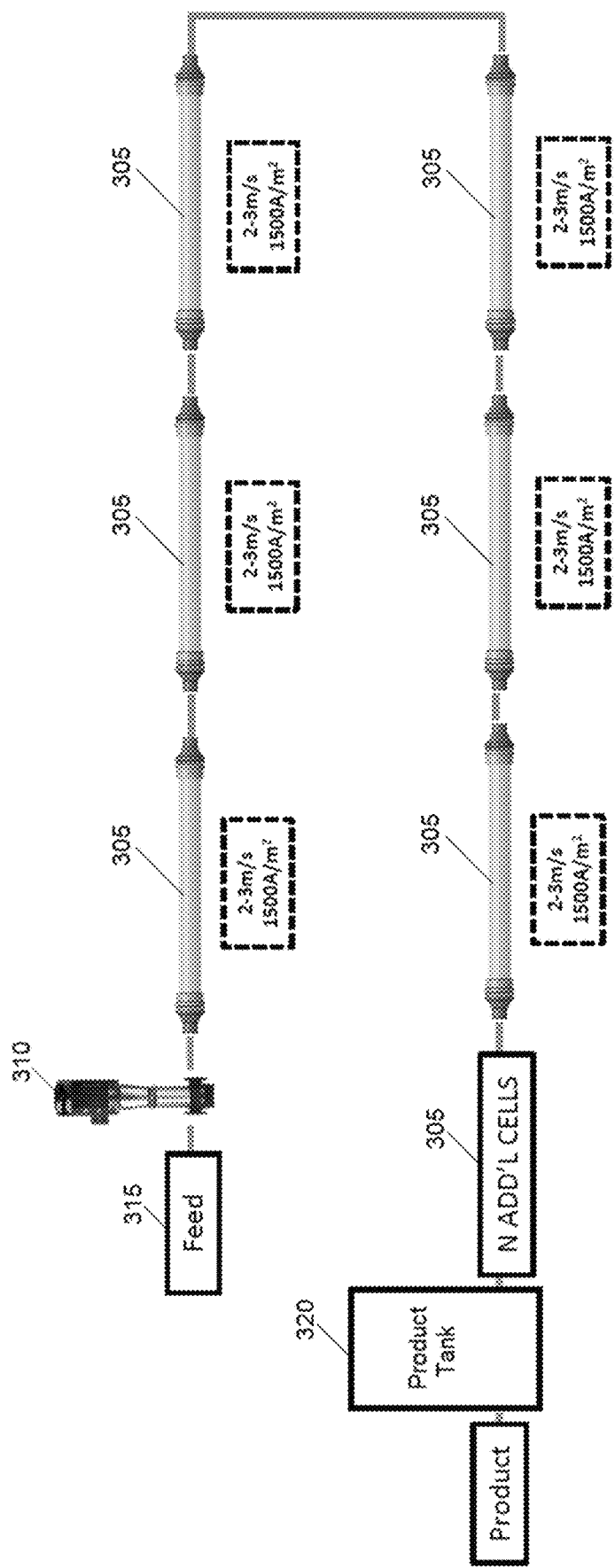
FIG. 11 depicts another example of a once-through electrolyzer system including a plurality of CTE cells in series.

In another embodiment, a system similar to that depicted in FIG. 10 may be provided, but the current density of all cells 305 may be reduced to below the nominal current density of the cells in the systems of FIGS. 8 and 9, for example, to 1500 A/m$^2$ as illustrated in FIG. 11. Fluid flow velocity may be the same, for example, 2-3 m/s, 2 m/s, or 2 m/s or greater for each cell 305 in the system.

Figure 12:
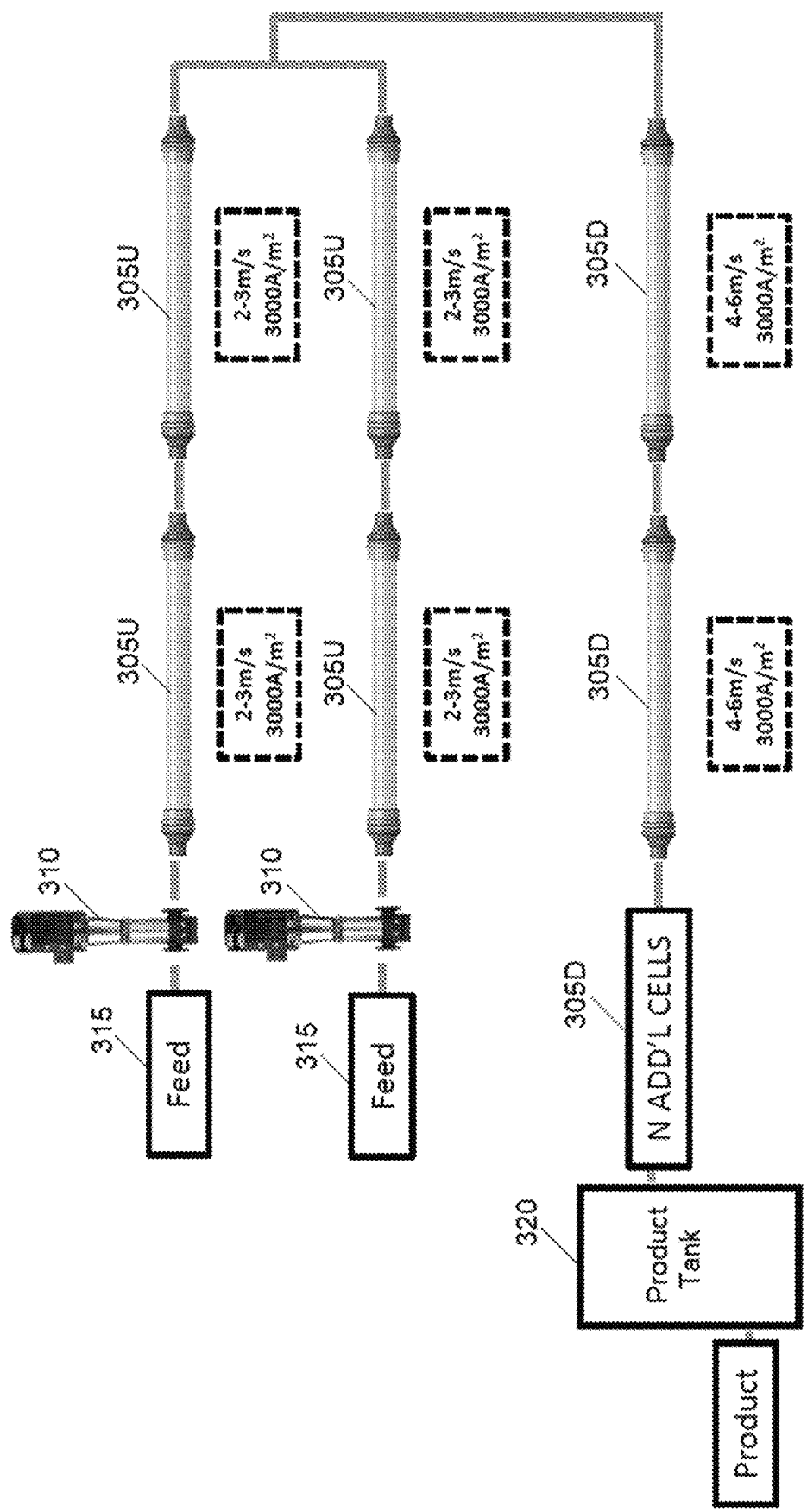
FIG. 12 depicts an example of a once-through electrolyzer system including a first plurality of CTE cells operated in parallel and a second plurality of CTE cells operated in series.

In some embodiments, the flow velocity of fluid through one or more cells in a system of CTE cells may be adjusted to a level that reduces or prevents scaling. In a system including multiple CTE cells in series, cells which would be expected to treat fluid with a higher pH, for example, cells in a downstream portion of the system, could be operated with the flow velocity of fluid through the cells set at a higher level that the flow velocity of fluid through cells which would be expected to treat fluid with a lower pH, for example, cells in an upstream portion of the system. In some embodiments, this may be achieved by operating upstream CTE cells in parallel and downstream CTE cells in series. For example, as illustrated in FIG. 12, there are four upstream cells 305U and two or more downstream cells 305D. A fluid inlet to the group of the downstream cells is in fluid communication with a combined fluid outlet of the upstream cells. A first group or a first parallel pair of upstream cells is in fluid communication upstream of a second group or second parallel pair of upstream cells. Fluid flow from the outlets of the second parallel pair of upstream cells is combined and enters an inlet of a first of a group of downstream cells. The fluid velocity of fluid entering the first of the group of downstream cells is the sum of the fluid velocities of fluid exiting the outlets of the second parallel pair of upstream cells. At least a second and, in some embodiments, more than two additional downstream cells are connected in series downstream of the first of the group of downstream cells. The fluid flow velocity through each of the upstream cells may be 2-3 m/s, for example, 2 m/s, or 2 m/s or greater. The fluid flow velocity through each of the downstream cells may be 4-6 m/s, for example, 4 m/s, or 4 m/s or greater. The current density applied to each of the upstream cells and each of the downstream cells may be equal, for example, 3000 A/m$^2$. In other embodiments, the current density applied across the electrodes of the upstream cells may be higher or lower than that applied to across the electrodes of the downstream cells. It is to be appreciated that system similar to that illustrated in FIG. 12 may include greater than two cells in parallel in each group of upstream cells, and/or may include greater than two groups of parallel cells. In some embodiments, the current density and/or flow rate in different CTE cells in a group of parallel CTE cells or in different series arranged CTE cells is different.

Figure 13:
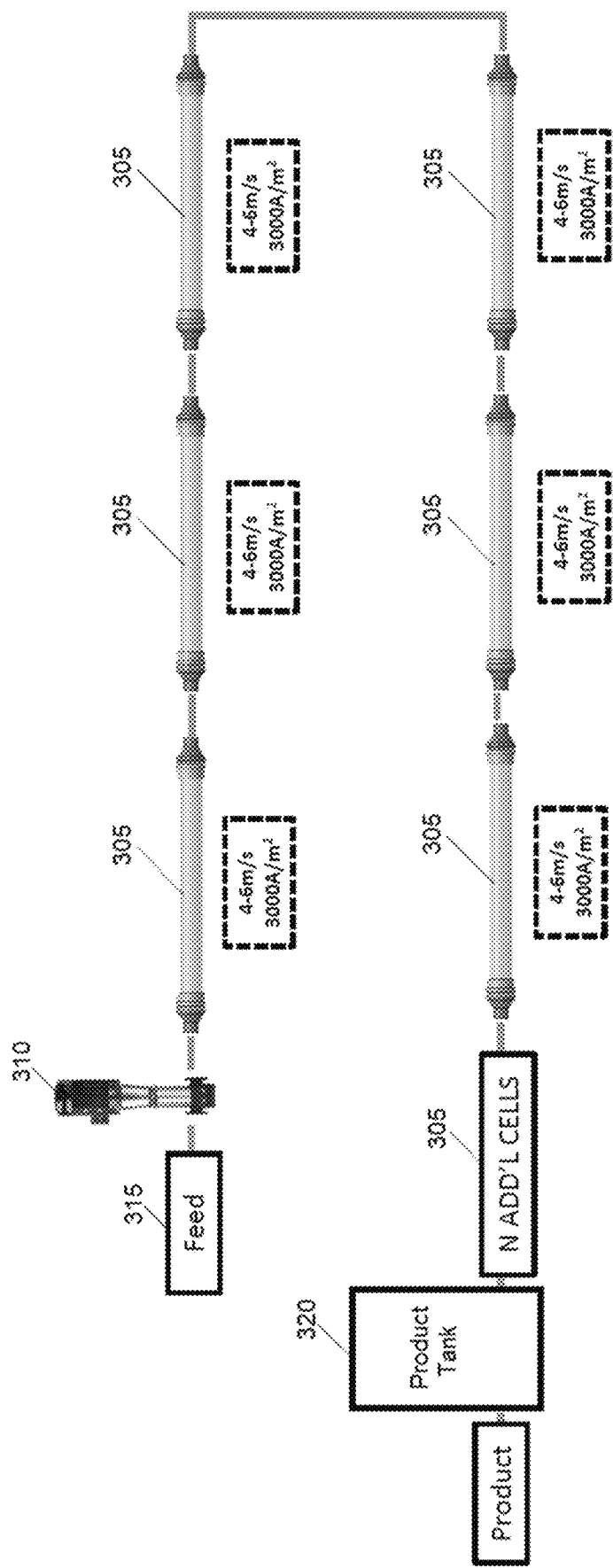
FIG. 13 depicts another example of a once-through electrolyzer system including a plurality of CTE cells in series.
Figure 14:
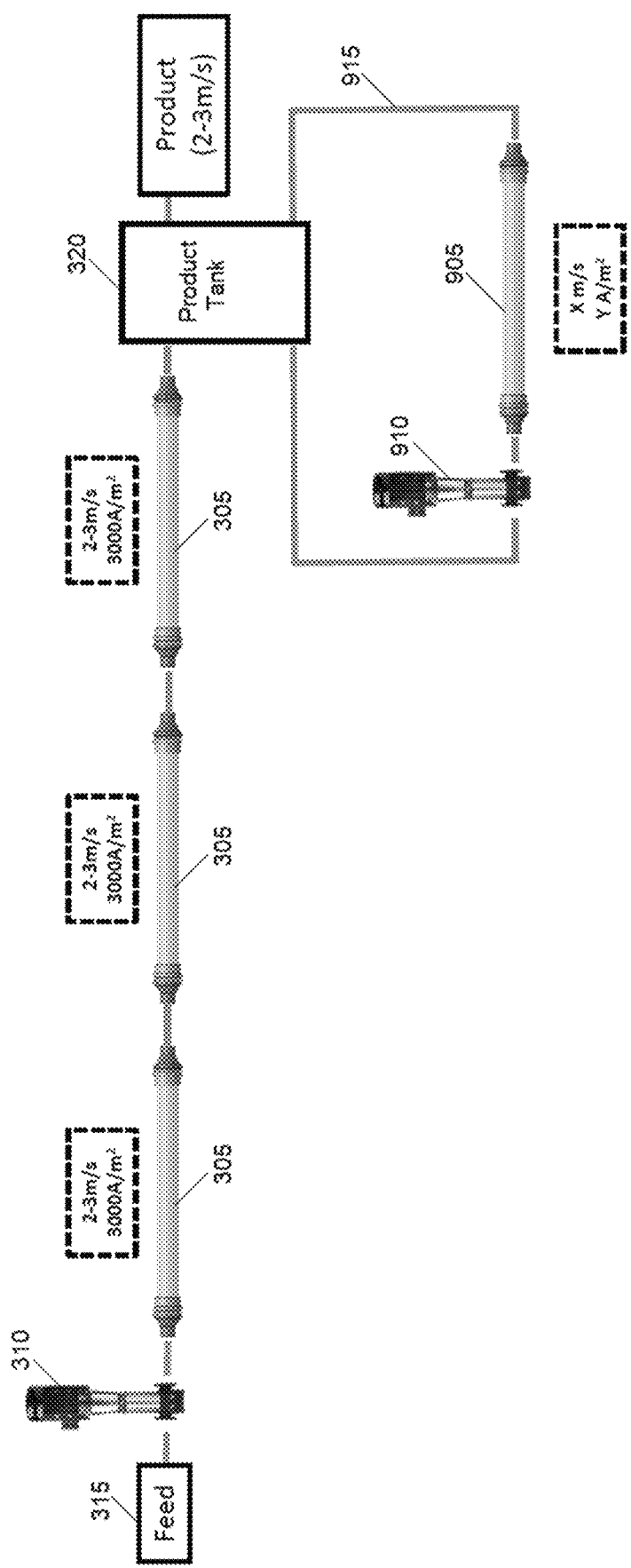
FIG. 14 depicts an example of an electrolyzer system including a first plurality of CTE cells operated in series and a parallel CTE cell disposed in a feed-and-bleed line from a product tank.

The velocity of fluid flow through CTE cells in a serial configuration, for example, as illustrated in FIGS. 10 and 11 may also be increased over a nominal fluid flow through cells in a system such as that illustrated in FIG. 13 or 14. The higher fluid flow velocity through the cells may allow each of the cells to operate at a higher current density than the cells in the systems of FIG. 10 or 11 while still exhibiting little or no scaling. As illustrated in FIG. 13, the higher flow velocity may be 4-6 m/s, for example, 4 m/s, or 4 m/s or greater. The applied current density applied to the cells in series operating at the higher fluid flow as illustrated in FIG. 12 may be, for example, 3000 A/m$^2$. The applied current density may be the same for each of the series arranged cells operated at the higher fluid flow velocity as illustrated in FIG. 13, but in other embodiments may be different for different cells, for example, lower for cells that are more downstream than other cells and higher for cells upstream of other cells in the system.

In another embodiment, a CTE cell may be provided in a feed-and-bleed fluid line. The feed-and-bleed fluid line may remove and return fluid to the product tank of a system such as illustrated in FIG. 8 which includes a plurality, for example, two, three, or more CTE cells in series that provide treated fluid to a product tank. One configuration of an embodiment in which a parallel CTE cell treats and recirculates fluid from the product tank is illustrated in FIG. 14. The treatment and recirculation of the fluid from the product tank 320 through the parallel CTE cell 905, pump 910, and feed-and-bleed fluid line 915 increases the concentration of NaOCl in the product tank 320 without increasing the risk of scaling in the series CTE cells 305. The series CTE cells 305 may operate at nominal fluid flow velocities of 2-3 m/s, for example, 2 m/s, or 2 m/s or greater and nominal current densities of 3000 A/m$^2$. The parallel CTE cell 905 may operate at a fluid flow of X m/s and a current density of Y A/m$^2$. The values of X and Y may be selected based on, for example, a desired concentration of NaOCl in the product tank 320. In some embodiments the fluid flow through the parallel CTE cell 905 may be 2-3 m/s, for example, 2 m/s, or 2 m/s or greater, or may be 4-6 m/s, for example, 4 m/s, or 4 m/s or greater. The current density applied across the electrodes of the parallel CTE cell may be, for example, any of 1500 A/m$^2$, 2000 A/m$^2$, 2500 A/m$^2$, or 3000 A/m$^2$, less than 1500 A/m$^2$, or more than 3000 A/m$^2$. The concentration of NaOCl in the liquid in the product tank 320 may be set or maintained at, for example, 3000 ppm or higher, for example, up to 6000 ppm or higher by recirculation of the product tank liquid through the parallel CTE cell 905. The system may operate under steady state conditions with treated fluid withdrawn from the product tank at the same velocity than fluid flows through the series CTE cells 305, for example, 2-3 m/s, 2 m/s, or 2 m/s or greater. The system may operate with treated fluid withdrawn from the product tank at a lower velocity than fluid flows through the series CTE cells 305 to build up a concentration of NaOCl in the product tank or may operate with treated fluid withdrawn from the product tank at a higher velocity than fluid flows through the series CTE cells 305, optionally with flow through the parallel CTE cell 905 suspended, to lower a concentration of NaOCl in the product tank.

Figure 15A:
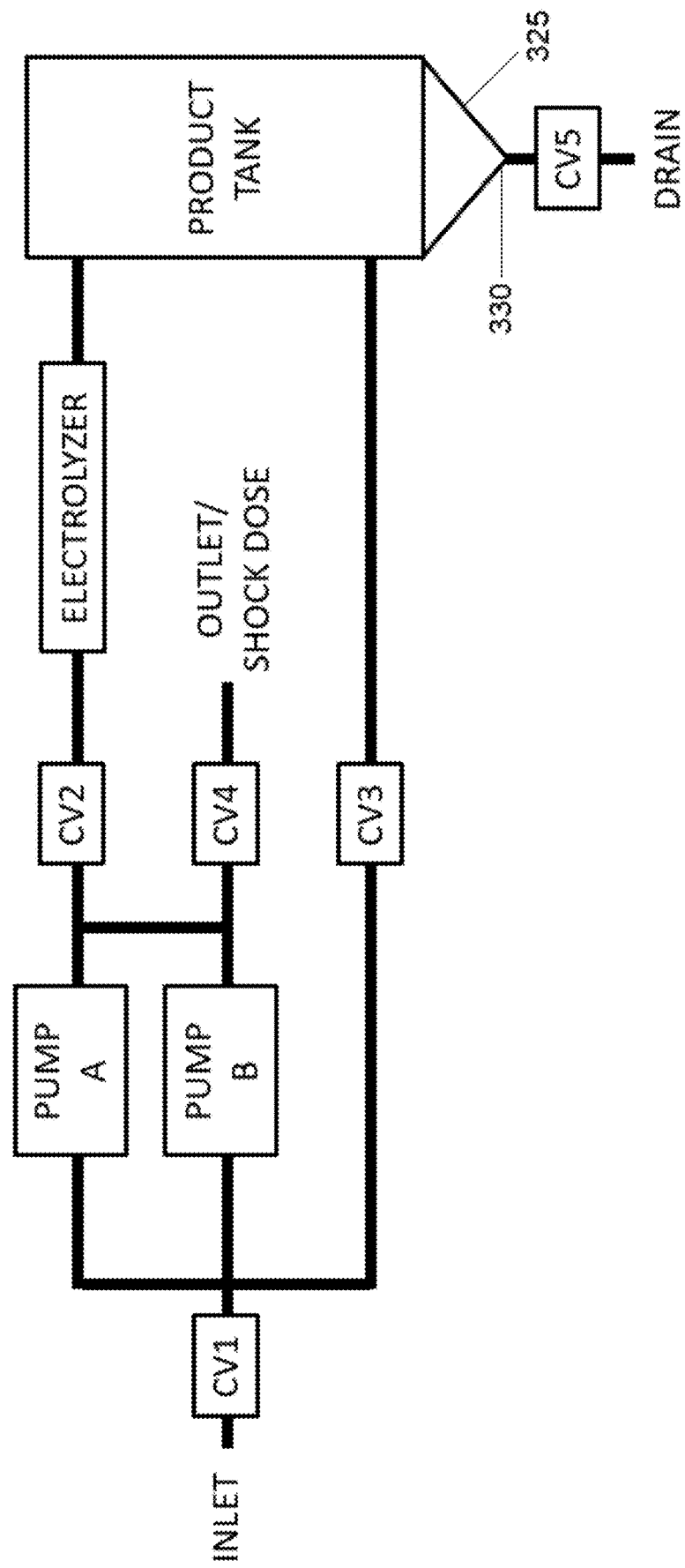
FIG. 15A depicts another example of a feed-and-bleed electrolyzer system.

Another embodiment of a feed-and-bleed type electrochemical cell system is illustrated in FIG. 15A. In this configuration, valves CV1 and CV2 are opened while valves CV3 and CV4 are closed. The electrolyzer, which may include one or more CTE cells fluidically and/or electrically coupled in series and/or parallel, and which may include a group of CTE cells arranged in accordance with any of the previously described embodiments, are operated via Pump A to draw feed fluid from the inlet of the system until the product tank is filled. During the tank fill or make-up operation, Pump A may operate at, for example, 12 m$^3$/hr or to flow fluid through the electrolyzer at 2-3 m/s. The nominal concentration of NaOCl in the product tank would be between about 1500 to 1800 ppm. Once the product tank is full, valve CV1 is closed and valve CV3 is opened. The electrolyzer is again operated, via Pump A and the fluid solution in the product tank is recycled back through the electrolyzer and back into the product tank. Operation during the recycle operation would be at a higher flow velocity, to enhance self-cleaning of the CTE cells of the electrolyzer. In some instances, the fluid flow velocity through the electrolyzer during the recycle operation would be 4-5 m/s (Pump A operating at, for example, 24 m$^3$/hr), and in others it would be higher. The maximum fluid flow velocity may be dependent upon the pressure rating of the CTE cells of the electrolyzer. The system would be continuously operated to achieve higher product strength. In some instances, the NaOCl product strength would reach 3,000 ppm. In other instances, higher NaOCl concentrations could be achieved. The peak concentration of NaOCl in the product tank may depend upon the balance between Mg and Ca precipitation against the maximum self-cleaning velocity. For dosing of the product to a point of use, valves CV1 and CV2 are closed, while valves CV3 and CV4 are opened. Pumps A and B are then used to externally shock dose the point of use, using the bulk product tank solution. The table in FIG. 15B shows example flow rates and valve and electrolyzer conditions during make-up, recycle, and shock dose operations.

In some embodiments, for example, as illustrated in FIG. 15A, the product tank, or the product tank(s) of any of the systems disclosed herein may include a lower end having sloped, for example, conical, sidewalls 325 and a precipitate outlet 330 that may be opened or closed with, for example, valve CV5. Calcium and magnesium deposits have a higher specific gravity than sodium hypochlorite or seawater and may tend to settle out in the product tank. The settled deposits may be flushed from the product tank at a desired interval or after achieving an unacceptable level, for example, by fluid, for example, seawater pumped into the product tank via Pump A. Valve CV5 may be opened during flushing of the product tank to allow the precipitates to flow outward.

The systems disclosed herein may draw feed, process liquid, or electrolyte, which in some embodiments is seawater, brine, or brackish water from sources external and/or internal to the systems. For example, if a system is a sea-based system, an external source may be the ocean and an internal source may be, for example, a ballast tank in a ship. In a land-based system, an external source may be the ocean and an internal source may be brackish wastewater from an industrial process performed in the system. The electrochlorination systems disclosed herein may produce chlorinated water and/or a solution including sodium hypochlorite from the water from the feed sources and may distribute it to a point of use. The point of use may be a source of cooling water for the system, a source of disinfection agent for a ballast tank of a ship, a downhole of an oil drilling system, or any other system in which chlorinated water may be useful. Various pumps, for example, pumps 310 and 910, may control the flow of fluid through the systems. One or more sensors may monitor one or more parameters of fluid flowing through the systems, for example, ionic concentration, chlorine concentration, temperature, or any other parameter of interest. The pumps and sensors may be in communication with a control system or controller which communicates with the sensors and pumps and controls operation of the pumps and other elements of the systems to achieve desired operating parameters. The controller used for monitoring and controlling operation of the various elements of system may include a computerized control system. Various aspects of the controller may be implemented as specialized software executing in a general-purpose computer system 1000 such as that shown in FIG. 16. The computer system 1000 may include a processor 1002 connected to one or more memory devices 1004, such as a disk drive, solid state memory, or other device for storing data. Memory 1004 is typically used for storing programs and data during operation of the computer system 1000. Components of computer system 1000 may be coupled by an interconnection mechanism 1006, which may include one or more busses (e.g., between components that are integrated within a same machine) and/or a network (e.g., between components that reside on separate discrete machines). The interconnection mechanism 1006 enables communications (e.g., data, instructions) to be exchanged between system components of system 1000. Computer system 1000 also includes one or more input devices 1008, for example, a keyboard, mouse, trackball, microphone, touch screen, and one or more output devices 1010, for example, a printing device, display screen, and/or speaker.

The output devices 1010 may also comprise valves, pumps, or switches which may be utilized to introduce product water (e.g. brackish water or seawater) from the feed source into an electrochlorination system as disclosed herein or a point of use and/or to control the speed of pumps. One or more sensors 1014 may also provide input to the computer system 1000. These sensors may include, for example, pressure sensors, chemical concentration sensors, temperature sensors, fluid flow rate sensors, or sensors for any other parameters of interest to an operator of an electrochlorination system. These sensors may be located in any portion of the system where they would be useful, for example, upstream of point of use and/or an electrochlorination system or in fluid communication with a feed source.

In addition, computer system 1000 may contain one or more interfaces (not shown) that connect computer system 1000 to a communication network in addition or as an alternative to the interconnection mechanism 1006.

Figure 17:
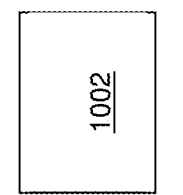
FIG. 17 illustrates a memory system for the control system of FIG. 16.
Figure 17:
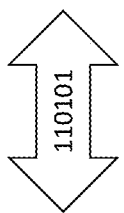
Figure 17:
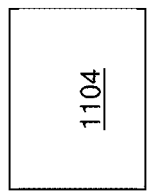
Figure 17:
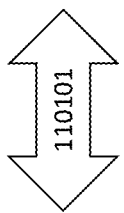
Figure 17:
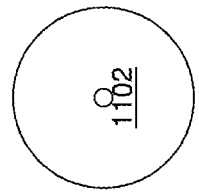

The storage system 1012, shown in greater detail in FIG. 17, typically includes a computer readable and writeable nonvolatile recording medium 1102 in which signals are stored that define a program to be executed by the processor 1002 or information to be processed by the program. The medium may include, for example, a disk or flash memory. Typically, in operation, the processor causes data to be read from the nonvolatile recording medium 1102 into another memory 1104 that allows for faster access to the information by the processor than does the medium 1102. This memory 1104 is typically a volatile, random access memory such as a dynamic random access memory (DRAM) or static memory (SRAM). It may be located in storage system 1012, as shown, or in memory system 1004. The processor 1002 generally manipulates the data within the integrated circuit memory 1104 and then copies the data to the medium 1102 after processing is completed. A variety of mechanisms are known for managing data movement between the medium 1102 and the integrated circuit memory element 1104, and aspects and embodiments disclosed herein are not limited thereto. Aspects and embodiments disclosed herein are not limited to a particular memory system 1004 or storage system 1012.

The computer system may include specially-programmed, special-purpose hardware, for example, an application-specific integrated circuit (ASIC). Aspects and embodiments disclosed herein may be implemented in software, hardware or firmware, or any combination thereof. Further, such methods, acts, systems, system elements and components thereof may be implemented as part of the computer system described above or as an independent component.

Although computer system 1000 is shown by way of example as one type of computer system upon which various aspects and embodiments disclosed herein may be practiced, it should be appreciated that aspects and embodiments disclosed herein are not limited to being implemented on the computer system as shown in FIG. 16. Various aspects and embodiments disclosed herein may be practiced on one or more computers having a different architecture or components that that shown in FIG. 16.

Computer system 1000 may be a general-purpose computer system that is programmable using a high-level computer programming language. Computer system 1700 may be also implemented using specially programmed, special purpose hardware. In computer system 1000, processor 1002 is typically a commercially available processor such as the well-known Pentium™ or Core™ class processors available from the Intel Corporation. Many other processors are available, including programmable logic controllers. Such a processor usually executes an operating system which may be, for example, the Windows 7, Windows 8, or Windows 10 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that aspects and embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects and embodiments disclosed herein may be performed on a client-server system that includes components distributed among one or more server systems that perform various functions according to various aspects and embodiments disclosed herein. These components may be executable, intermediate (e.g., IL) or interpreted (e.g., Java) code which communicate over a communication network (e.g., the Internet) using a communication protocol (e.g., TCP/IP). In some embodiments one or more components of the computer system 200 may communicate with one or more other components over a wireless network, including, for example, a cellular telephone network.

It should be appreciated that the aspects and embodiments disclosed herein are not limited to executing on any particular system or group of systems. Also, it should be appreciated that the aspects and embodiments disclosed herein are not limited to any particular distributed architecture, network, or communication protocol. Various aspects and embodiments disclosed herein are may be programmed using an object-oriented programming language, such as SmallTalk, Java, C++, Ada, or C# (C-Sharp). Other object-oriented programming languages may also be used.

Alternatively, functional, scripting, and/or logical programming languages may be used, for example ladder logic. Various aspects and embodiments disclosed herein are may be implemented in a non-programmed environment (e.g., documents created in HTML, XML or other format that, when viewed in a window of a browser program, render aspects of a graphical-user interface (GUI) or perform other functions). Various aspects and embodiments disclosed herein may be implemented as programmed or non-programmed elements, or any combination thereof.

EXAMPLE

As proof of the parallel feed and bleed concept (for example, as illustrated in FIG. 14), a product tank with 3.5% synthetic seawater was recirculated across a single CTE cell, at 2000 and 3000 A/m$^2$ current density respectively. The product strengths were then allowed to increase over time, with NaOCl concentrations of approximately 800, 1300, 2200, 3500, and 6100 ppm achieved, without precipitate formation.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

What is claimed is:

1. An electrochlorination system comprising:
a source of feed fluid;
a product fluid outlet;
a plurality of electrochemical cells connected fluidically between the source of feed fluid and the product fluid outlet, the plurality of electrochemical cells including at least two first electrochemical cells fluidically connected in parallel and a second electrochemical cell fluidically connected in series fluidically downstream of the at least two first electrochemical cells, the system being configured to operate the at least two first electrochemical cells at a first current density and a first flow rate, and to operate the second electrochemical cell at a second current density and a second flow rate different from the respective first current density and first flow rate;
a product tank fluidically connected to a fluid outlet of the plurality of electrochemical cells;
a first valve and first fluid pump disposed fluidically between the source of feed fluid and the plurality of electrochemical cells;
a recirculation conduit fluidically connecting an outlet of the product tank to an input of the first fluid pump;
a second valve disposed in the recirculation conduit between the outlet of the product tank and the inlet of the first fluid pump;
a product outlet conduit fluidically connected to a point in the recirculation conduit between the outlet of the product tank and the inlet of the first fluid pump;
a second fluid pump and third valve disposed in the product outlet conduit; and
a controller configured to operate the system in a first recirculation mode of operation in which the first and second valves are open and the first pump pumps fluid through the plurality of electrochemical cells, the product tank, the recirculation conduit, and the first and second valves, and configured to operate the system in second dosing mode of operation in which the first valve is closed, the second and third valves are opened, and the second pump pumps fluid from the product tank to a point of use.

2. The system of claim 1, wherein at least two of the plurality of electrochemical cells are electrically connected in parallel.

3. The system of claim 1, wherein the plurality of electrochemical cells includes electrochemical cells that are electrically connected in series and electrochemical cells that are electrically connected in parallel.

4. The system of claim 1, wherein at least two of the plurality of electrochemical cells are electrically connected in series.

5. The system of claim 1, wherein the plurality of electrochemical cells includes electrochemical cells that are electrically connected in series with electrochemical cells that are electrically connected in parallel.

6. The system of claim 1, wherein the plurality of electrochemical cells includes one or more electrochemical cells that are electrically independent of others of the plurality of electrochemical cells.

7. The system of claim 1, wherein the controller is further configured to operate the at least two first electrochemical cells at the first current density and to operate the second electrochemical cell at the second current density, the first current density being higher than the second current density.

8. The system of claim 7, further comprising a third electrochemical cell disposed fluidically between the at least two first electrochemical cells and the second electrochemical cell.

9. The system of claim 8, wherein the controller is further configured to operate the third electrochemical cell at a third current density that is lower than the first current density and higher than the second current density.

10. The system of claim 9, further comprising a fourth electrochemical cell disposed fluidically downstream of the second electrochemical cell, the controller being further configured to operate the fourth electrochemical cell at the second current density.

11. The system of claim 10, further comprising a pump, wherein the controller is further configured to cause the pump to flow fluid from the source of feed fluid through the at least two first electrochemical cells at the first flow rate and to flow the fluid through each of the second electrochemical cell, the third electrochemical cell, and the fourth electrochemical cell at the second flow rate, the second flow rate being greater than the first flow rate.

12. The system of claim 1, wherein the controller is further configured to operate each of the at least two first electrochemical cells at the first flow rate and to operate the second electrochemical cell at the second flow rate, the first flow rate being less than the second flow rate.

13. The system of claim 12, wherein fluid outlet conduits from each of at least two first electrochemical cells are combined into a single fluid input conduit of the second electrochemical cell.

14. The system of claim 13, wherein the first current density is greater than the second current density.

15. The system of claim 1, further comprising a parallel electrochemical cell having a fluid inlet connected to a fluid outlet of the product tank and a fluid outlet connected to a fluid inlet of the product tank.

16. The system of claim 1, wherein the controller is further configured to operate the parallel electrochemical cell at a third current density different from the first current density and from the second current density.

17. The system of claim 15, wherein the controller is further configured to operate the parallel electrochemical cell at a third flow rate different from the first flow rate and from the second flow rate.

18. The system of claim 1, wherein the controller is further configured to operate the parallel electrochemical cell at one of the first current density or the second current density.

19. The system of claim 15, wherein the controller is further configured to operate the parallel electrochemical cell at one of the first flow rate or the second flow rate.

20. The system of claim 1, further comprising a conduit fluidically connecting an outlet of the first pump to an inlet of the third valve, the controller, when operating the system in the second dosing mode of operation, further being configured to cause the first pump to pump fluid from the product tank through the third valve to the point of use.

21. An electrochlorination system comprising:
   a product fluid outlet;
   a plurality of electrochemical cells connected fluidically between a source of feed fluid and the product fluid outlet, the plurality of electrochemical cells including at least two first electrochemical cells fluidically connected in parallel and a second electrochemical cell fluidically connected in series fluidically downstream of the at least two first electrochemical cells, the system being configured to operate the at least two first electrochemical cells at a first current density and a first flow rate, and to operate the second electrochemical cell with at least one of a second current density or a second flow rate different from the respective first current density and first flow rate;
   a product tank fluidically connected to a fluid outlet of the plurality of electrochemical cells;
   a recirculation conduit fluidically connecting an outlet of the product tank to an inlet of the plurality of electrochemical cells;
   a product outlet conduit fluidically connected to a point in the recirculation conduit between the outlet of the product tank and the inlet of the plurality of electrochemical cells;
   a controller configured to operate the system in a first recirculation mode of operation in which fluid is pumped through the plurality of electrochemical cells, the product tank, the recirculation conduit, and configured to operate the system in second dosing mode of operation in which fluid is plumped from the product tank through the product outlet conduit to a point of use.

* * * * *